(12) United States Patent
Korus et al.

(10) Patent No.: US 10,525,773 B2
(45) Date of Patent: Jan. 7, 2020

(54) WHEEL AND TIRE ASSEMBLY

(71) Applicant: LINDSAY CORPORATION, Omaha, NE (US)

(72) Inventors: Thomas J. Korus, Lindsay, NE (US); Jochen Pfrenger, The Woodlands, TX (US)

(73) Assignee: Lindsay Corporation, Omaha, NE (US)

( * ) Notice: Subject to any disclaimer, the term of this patent is extended or adjusted under 35 U.S.C. 154(b) by 57 days.

(21) Appl. No.: 15/980,244

(22) Filed: May 15, 2018

(65) Prior Publication Data

US 2018/0257433 A1 Sep. 13, 2018

Related U.S. Application Data

(60) Continuation of application No. 15/378,348, filed on Dec. 14, 2016, now Pat. No. 9,969,218, which is a division of application No. 14/815,649, filed on Jul. 31, 2015, now Pat. No. 9,718,306, which is a division
(Continued)

(51) Int. Cl.
| | |
|---|---|
| *B60C 7/10* | (2006.01) |
| *A01G 25/09* | (2006.01) |
| *B60B 3/04* | (2006.01) |
| *B60C 7/24* | (2006.01) |
| *B60B 25/02* | (2006.01) |
| *B60C 11/03* | (2006.01) |
| *B60B 25/00* | (2006.01) |
| *B60C 7/08* | (2006.01) |
| *B60C 17/04* | (2006.01) |
| *B60B 15/02* | (2006.01) |

(52) U.S. Cl.
CPC ............. *B60C 7/10* (2013.01); *A01G 25/09* (2013.01); *A01G 25/092* (2013.01); *B60B 3/04* (2013.01); *B60B 25/002* (2013.01); *B60B 25/02* (2013.01); *B60C 7/24* (2013.01); *B60C 11/0311* (2013.01); *B60B 15/025* (2013.01); *B60B 2900/212* (2013.01); *B60B 2900/541* (2013.01); *B60C 7/08* (2013.01); *B60C 17/041* (2013.01); *Y10T 152/10* (2015.01)

(58) Field of Classification Search
CPC .... B60C 7/00; B60C 7/08; B60C 7/10; B60C 7/24; B60C 7/26; B60C 15/0233; A01G 25/09; A01G 25/092; B60B 25/002; B60B 25/02; B60B 3/04
See application file for complete search history.

(56) References Cited

U.S. PATENT DOCUMENTS

| | | | | |
|---|---|---|---|---|
| 1,355,166 A | * | 10/1920 | Rice | B60B 25/02 301/32 |
| 1,433,499 A | * | 10/1922 | Day | B60B 25/02 301/32 |

(Continued)

*Primary Examiner* — Kip T Kotter
(74) *Attorney, Agent, or Firm* — Hovey Williams LLP

(57) ABSTRACT

A wheel assembly comprising a rigid wheel including a radially outer rim wall presenting a polygonal shape with a plurality of outermost vertices connecting a plurality of planar faces, and a flexible tire mounted on the outer rim wall. The tire is supported by the vertices of the rim wall and is separated from the rim faces by a space, portions of the tire located between the vertices being configured to flex inwardly when subject to ground engaging pressure.

20 Claims, 24 Drawing Sheets

Related U.S. Application Data of application No. 13/455,663, filed on Apr. 25, 2012, now Pat. No. 9,302,539.

(56) References Cited

U.S. PATENT DOCUMENTS

| | | | | |
|---|---|---|---|---|
| 2,331,581 A | * | 10/1943 | Thompson | B60O 7/08 152/308 |
| 8,651,154 B1 | * | 2/2014 | Chira | B60C 27/16 152/221 |

* cited by examiner

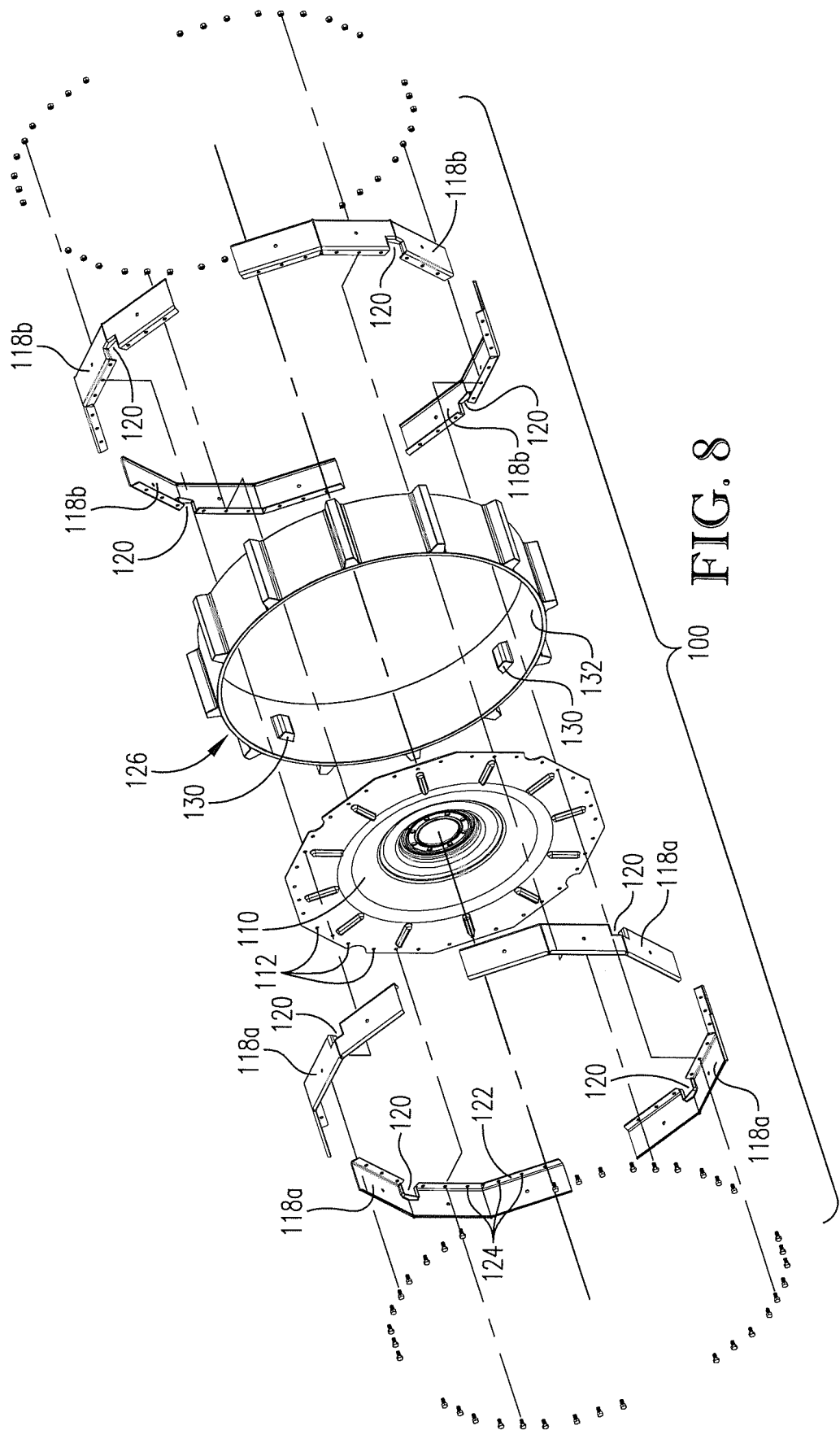

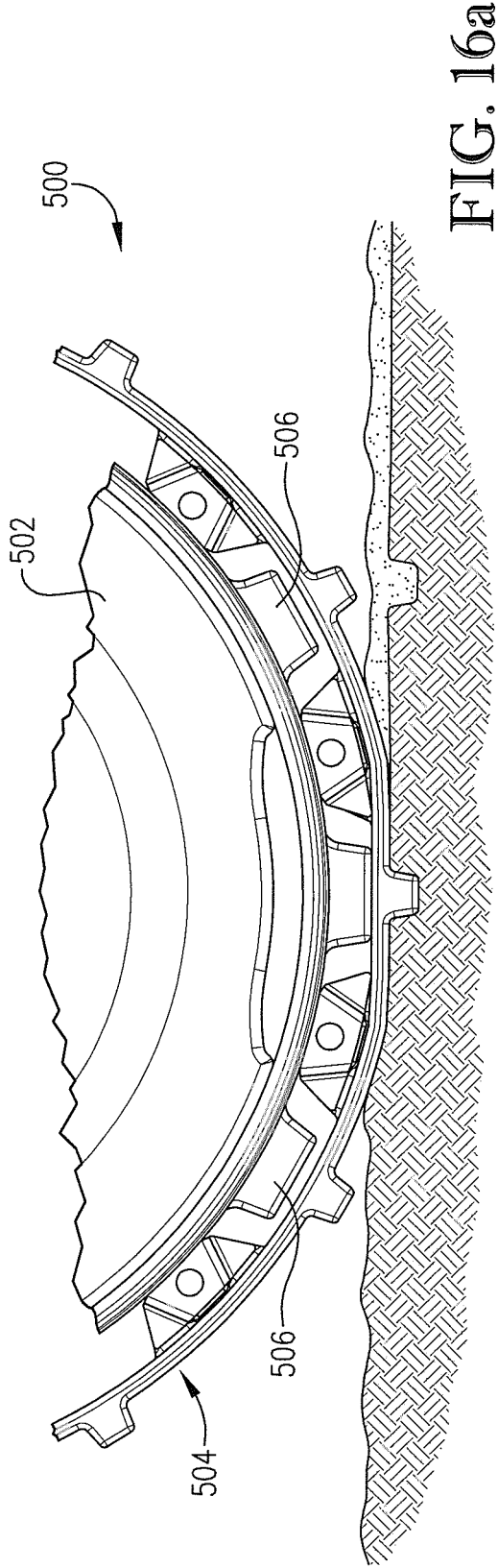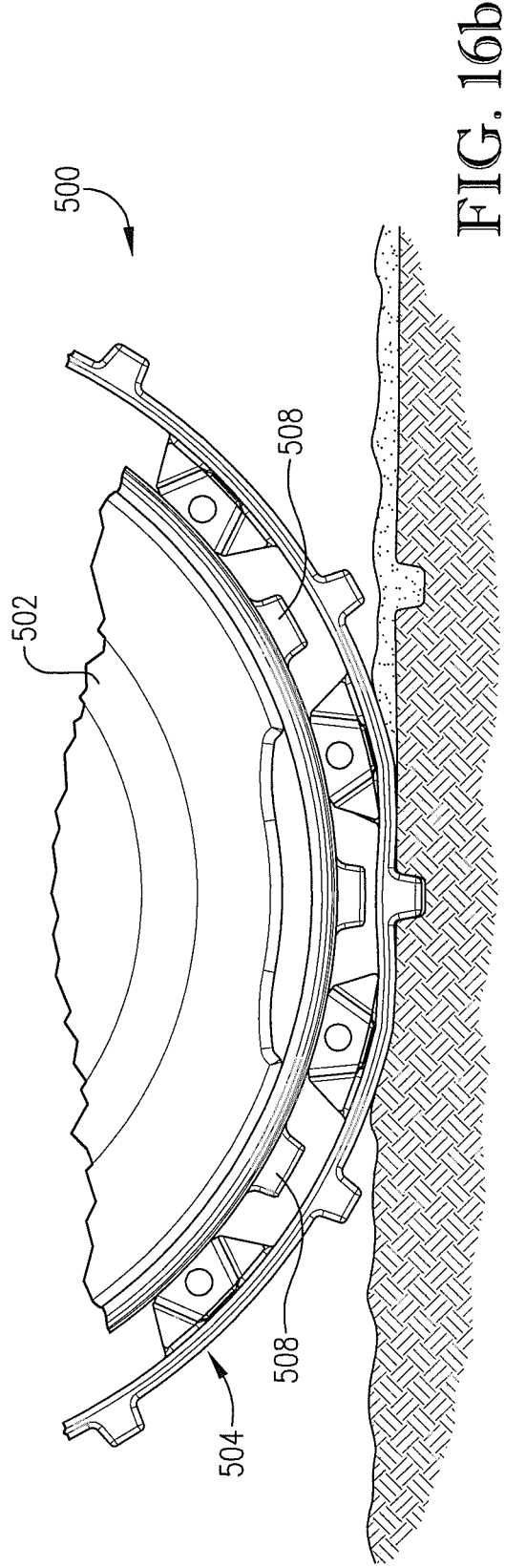

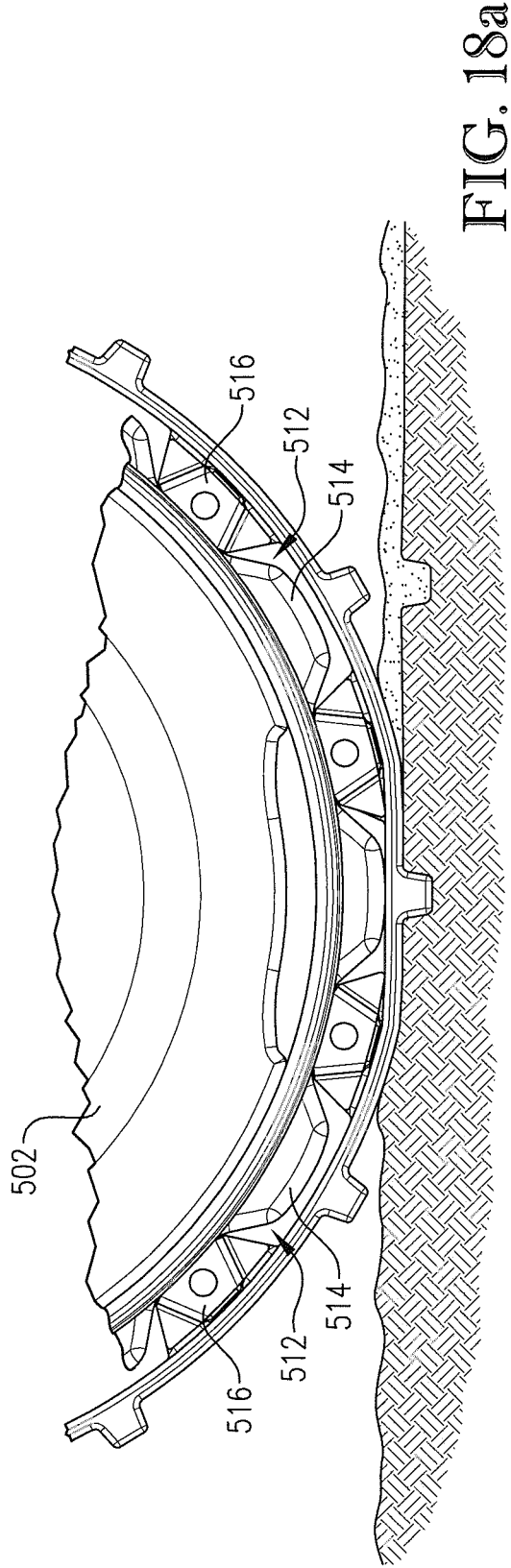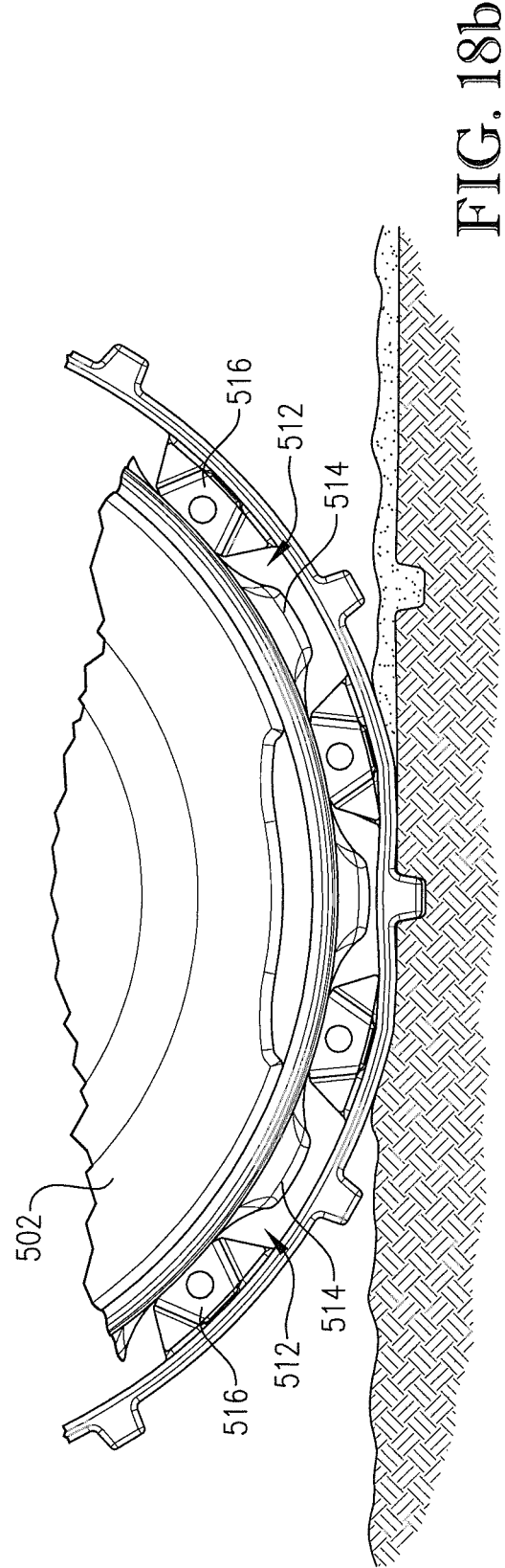

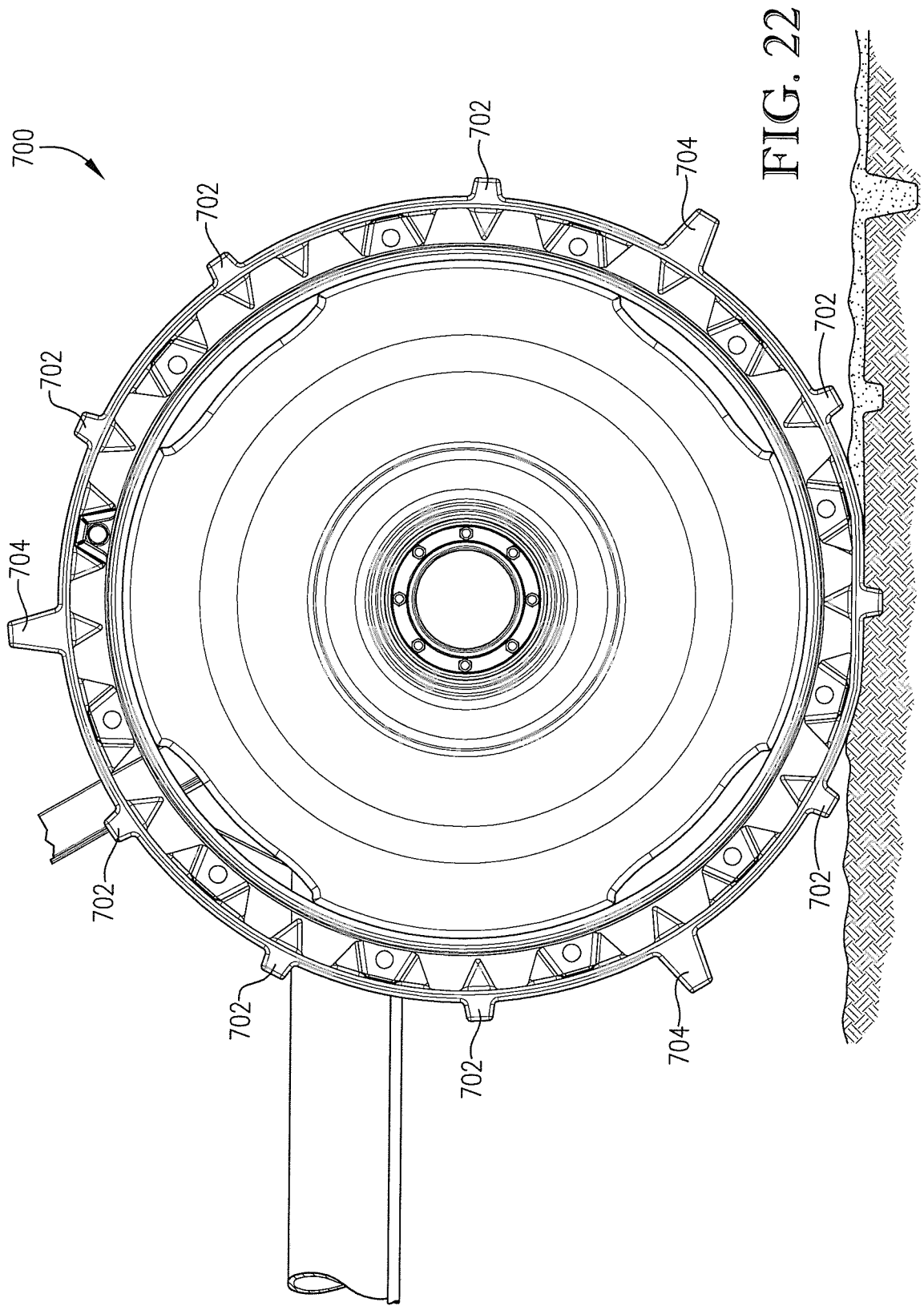

WHEEL AND TIRE ASSEMBLY

RELATED APPLICATIONS

The present application is a continuation application of U.S. Patent Application titled "WHEEL AND TIRE ASSEMBLY", Ser. No. 15/378,348, filed Dec. 14, 2016 (issued as U.S. Pat. No. 9,969,218). application Ser. No. 15/378,348 is a divisional application of U.S. Patent Application titled "WHEEL AND TIRE ASSEMBLY", Ser. No. 14/815,649, filed Jul. 31, 2015 (issued as U.S. Pat. No. 9,718,306). application Ser. No. 14/815,649 is a divisional application of U.S. Patent Application titled "WHEEL AND TIRE ASSEMBLY", Ser. No. 13/455,663, filed Apr. 25, 2012 (issued as U.S. Pat. No. 9,302,539). The above-identified patents and patent applications are hereby incorporated by reference in their entireties into the present application.

BACKGROUND

1. Field

Embodiments of the present invention relate to wheel and tire assemblies for use with airless tires. More particularly, embodiments of the present invention relate to airless wheel assemblies with certain performance characteristics of pneumatic tires.

2. Related Art

Irrigation systems include elevated water conduits supported by mobile towers. Such mobile towers are mounted on wheels that propel the towers along the ground to be irrigated. The wheels typically include pneumatic tires that require periodic maintenance, including adjusting air pressure, repairing tires that develop holes or other damage, and replacing old or damaged tires that are beyond repair.

Because irrigation systems and similar agricultural equipment are typically used in fields or other remote locations, monitoring the tires for problems and reaching the tires to perform maintenance and repairs can be inconvenient or difficult. If a tire loses air pressure and is not repaired in a timely manner, damage to the tire, to the equipment mounted on the tire, or both may result.

One solution to the challenges presented by the use of pneumatic tires involves using wheels without tires. While this approach addresses most of the problems of tire maintenance, repair and replacement, it presents other challenges. Tireless wheels, for example, are rigid and experience greater ground penetration than a flexible tire, thereby creating ruts or otherwise disturbing the land more than a pneumatic tire.

Similar problems exist for tractors, automobiles, and other vehicles that typically use pneumatic tires.

Accordingly, there is a need for a solution which overcomes the limitations described above.

SUMMARY

A wheel assembly in accordance with an embodiment of the invention comprises a rigid wheel including a radially outer rim wall presenting a polygonal shape with a plurality of outermost vertices connecting a plurality of planar faces, and a flexible tire mounted on the outer rim wall. The flexible tire is supported by the vertices of the rim wall and is separated from the rim faces by a space, and portions of the tire located between the vertices are configured to flex inwardly when subject to ground engaging pressure.

A wheel assembly in accordance with another embodiment of the invention comprises a rigid wheel including an inner hub and a plurality of spoke elements extending radially outwardly from the hub, and an outer flexible airless tire mounted on the wheel such that the tire is supported by the spoke elements, portions of the tire located between the spoke elements being configured to flex inwardly when subject to ground engaging pressure.

A mobile irrigation system tower in accordance with yet another embodiment of the invention comprises a structure for supporting an irrigation system conduit, and a plurality of wheel assemblies supporting the structure.

Each wheel assembly includes a rigid wheel including a radially outer rim wall presenting a polygonal shape with a plurality of outermost vertices connecting a plurality of planar faces, and a flexible airless tire mounted on the outer rim wall such that the tire is supported by the vertices of the rim wall and is separated from the rim faces by a space, portions of the tire located between the vertices being configured to flex inwardly when subject to ground engaging pressure.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWINGS

FIG. 8 is an exploded view of the wheel assembly of FIG. 7;

FIG. 16a is a fragmented side elevation view of a wheel assembly constructed according to another embodiment of the invention, the wheel assembly including a rigid wheel and a flexible airless tire and further including a plurality of first removable spacers interposed between the wheel and the tire;

FIG. 16b is a fragmented side view of the wheel assembly of FIG. 16a, the wheel assembly including a plurality of second removable spacers, the second removable spacers being smaller than the first removable spacers;

FIG. 18a is a fragmented side elevation view of a wheel assembly constructed according to another embodiment of the invention, the wheel assembly including a rigid wheel and a flexible airless tire and further including a spacer component with a plurality of inflatable sections interposed between the wheel and the tire, the inflatable sections being inflated to a first, large size;

FIG. 18b is a fragmented side view of the wheel assembly of FIG. 18a, the inflatable sections being inflated to a second, small size;

FIG. 22 is a side elevation view of a wheel assembly constructed according to another embodiment of the invention, the wheel assembly including a rigid wheel and a flexible airless tire mounted on the wheel, the tire including a plurality of traction lugs of varying size.

Figure 1:
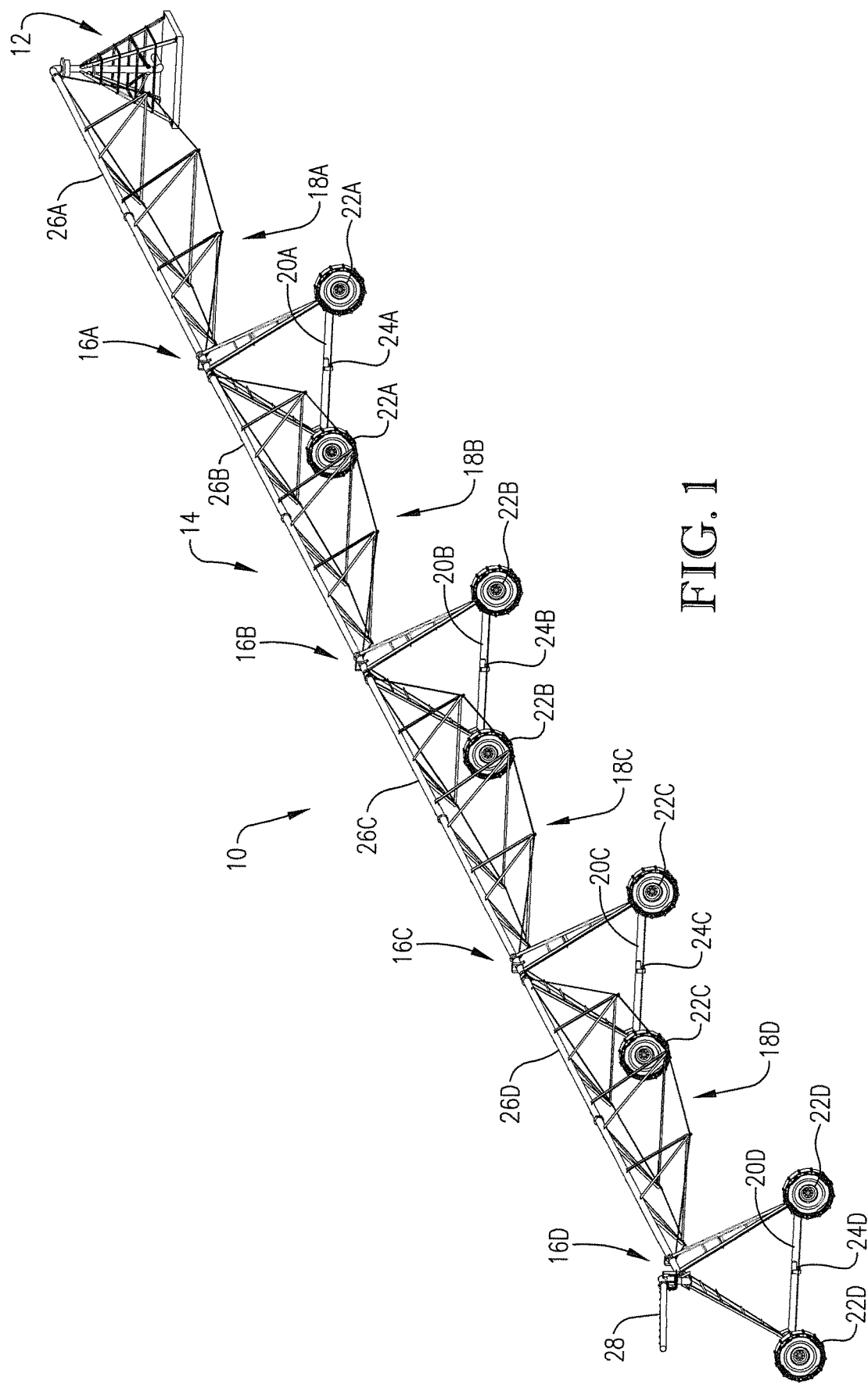
FIG. 1 is a perspective view of an exemplary irrigation system including wheel assemblies constructed in accordance with embodiments of the invention.
Figure 2:
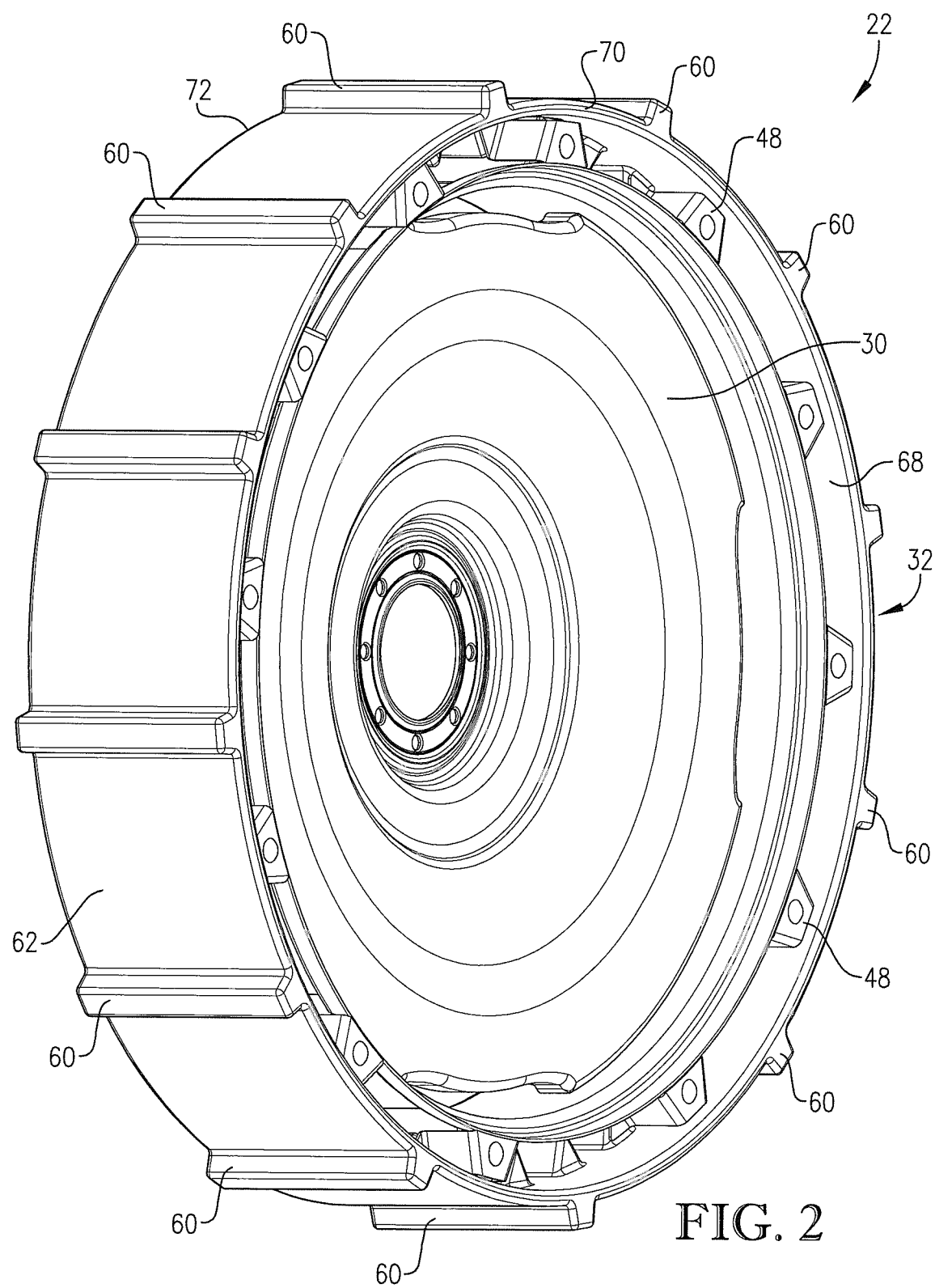
FIG. 2 is a first side perspective view of one of the wheel assemblies of FIG. 1, the wheel assembly including a rigid wheel and a flexible airless tire mounted on the wheel.
Figure 3:
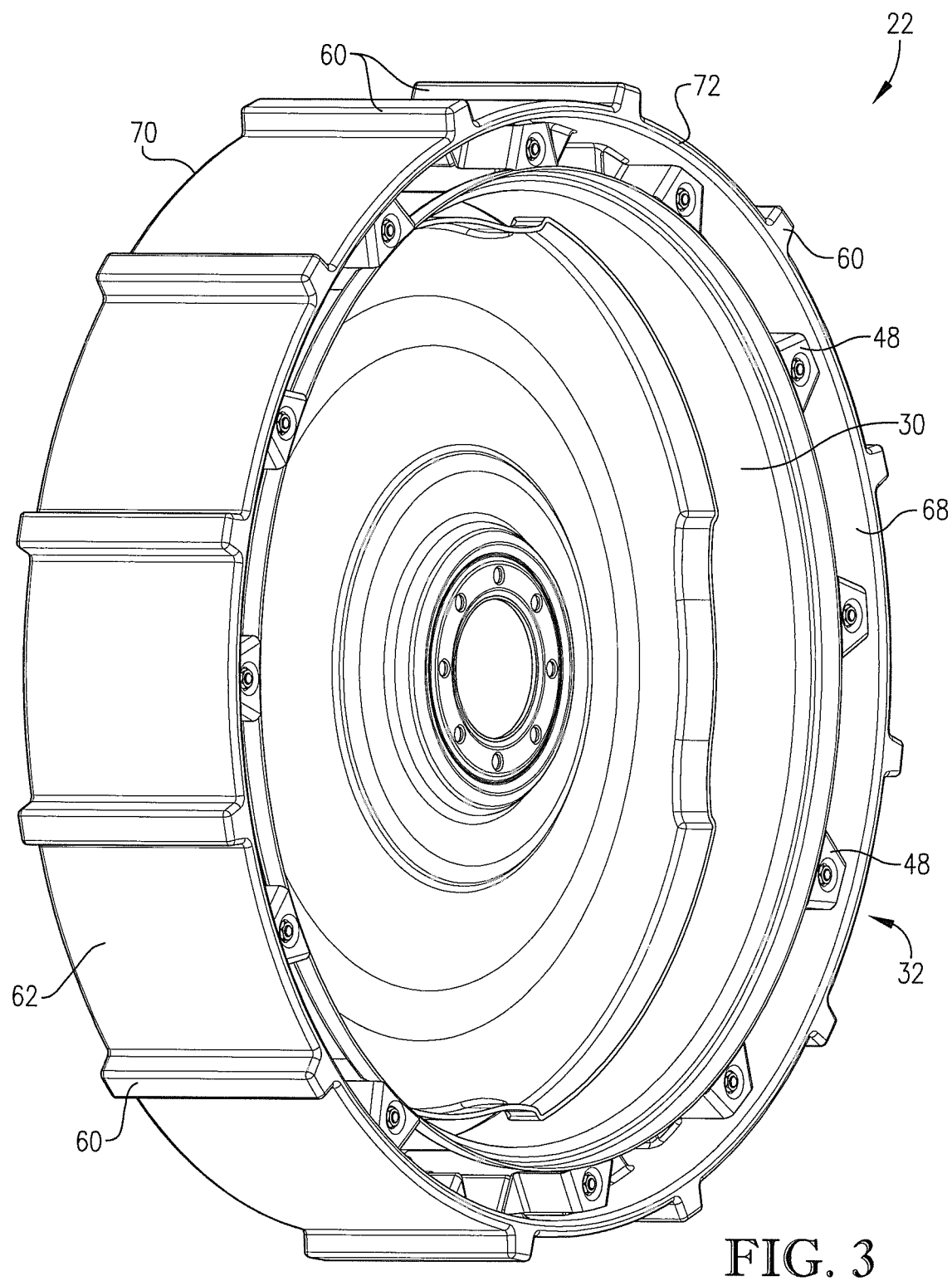
FIG. 3 is a second side perspective view of the wheel assembly of FIG. 2.
Figure 4:
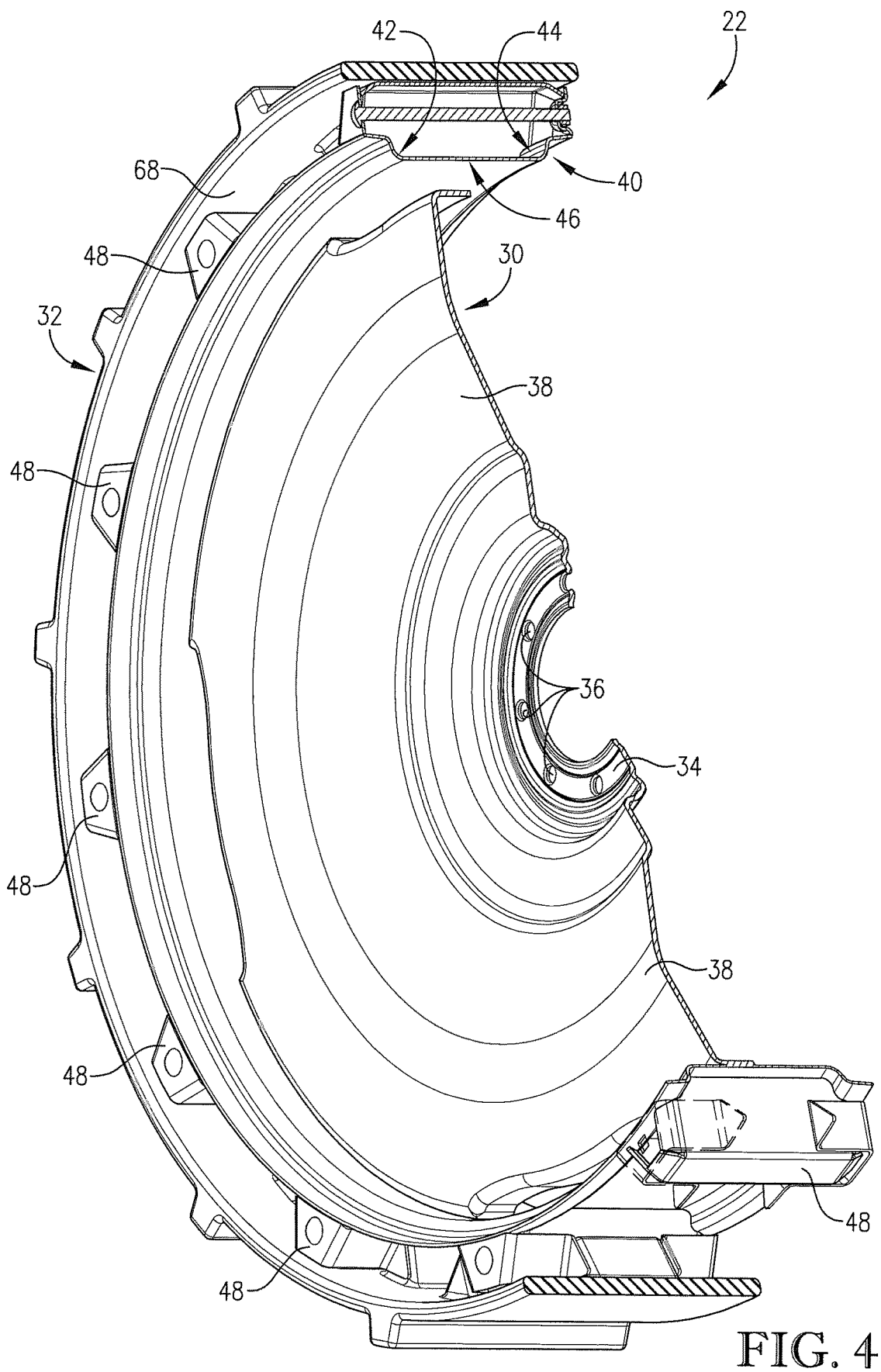
FIG. 4 is a perspective fragmentary view of the wheel assembly of FIG. 2.
Figure 5:
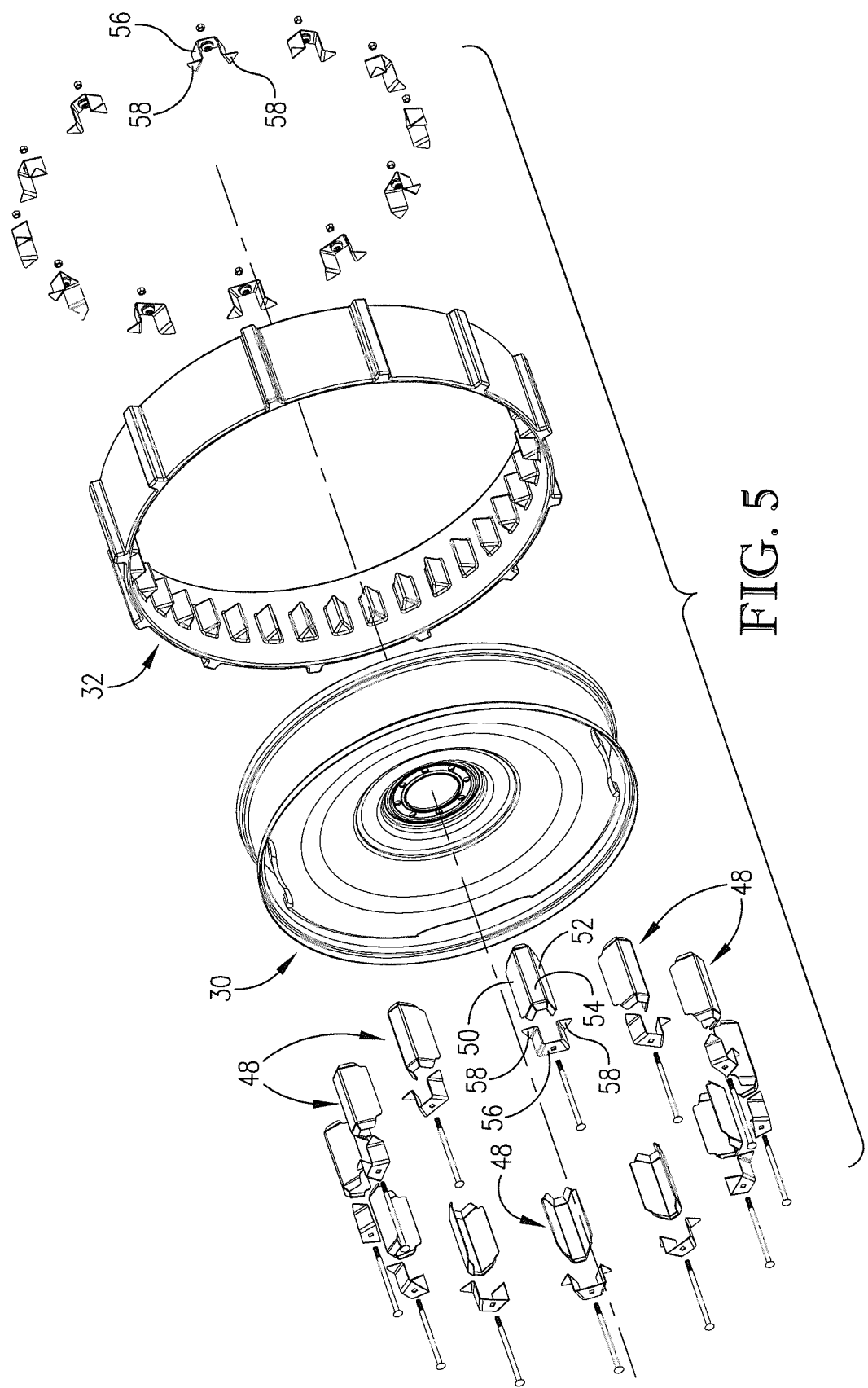
FIG. 5 is an exploded view of the wheel assembly of FIG. 2.

The drawing figures do not limit the present invention to the specific embodiments disclosed and described herein.

The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, an exemplary irrigation system 10 is illustrated including a plurality of wheel assemblies constructed in accordance with embodiments of the invention. The illustrated irrigation system 10 is a central pivot irrigation system that broadly comprises a fixed central pivot 12 and a main section 14 pivotally connected to the central pivot 12. The irrigation system 10 may also comprise an extension arm (also commonly referred to as a "swing arm" or "corner arm") pivotally connected to the free end of the main section.

The fixed central pivot 12 may be a tower or any other support structure about which the main section 14 may pivot. The central pivot 12 has access to a well, water tank, or other source of water and may also be coupled with a tank or other source of agricultural products to inject fertilizers, pesticides and/or other chemicals into the water for application during irrigation.

The main section 14 may comprise a number of mobile support towers 16A-D, the outermost 16D of which is referred to herein as an "end tower". The support towers are connected to the fixed central pivot 12 and to one another by truss sections 18A-D or other supports to form a number of interconnected spans. The irrigation system 10 illustrated in FIG. 1 includes four mobile support towers 16A-D; however, it may comprise any number of mobile support towers without departing from the scope of the present invention.

Each mobile tower may include a drive tube 20A-D on which a pair of wheel assemblies 22A-D is mounted. Embodiments of the wheel assemblies 22A-D are described in more detail below. A drive motor 24A-D is mounted to each drive tube 20A-D for driving the wheel assemblies 22A-D. The motors 24A-D may include integral or external relays so they may be turned on, off, and reversed. The motors may also have several speeds or be equipped with variable speed drives.

Each of the truss sections 18A-D carries or otherwise supports a conduit section 26A-D or other fluid distribution mechanism that is connected in fluid communication with all other conduit sections. A plurality of sprinkler heads, spray guns, drop nozzles, or other fluid-emitting devices are spaced along the conduit sections 26A-D to apply water and/or other fluids to land underneath the irrigation system.

The irrigation system 10 may also include an optional extension arm (not shown) pivotally connected to the end tower 16D and supported by a swing tower with steerable wheels driven by a motor. The extension arm may be joined to the end tower by an articulating pivot joint. The extension arm is folded inward relative to the end tower when it is not irrigating a corner of a field and may be pivoted outwardly away from the end tower while irrigating the corners of a field.

The irrigation system 10 may also include one or more high pressure sprayers or end guns 28 mounted to the end tower 16D or to the end of the extension arm. The end guns 28 may be activated at the corners of a field or other designated areas to increase the amount of land that can be irrigated.

It will be appreciated that the irrigation system 10 is illustrated and described herein as one exemplary implementation of the wheel assemblies 22 described in detail below. Other, equally preferred implementations of the wheel assemblies 22 not shown or discussed in detail herein may include, without limitation, other types of irrigation systems, such as lateral irrigation systems, other types of agricultural equipment, such as wagons, carts, implements, and so forth, or other types of vehicles such as buses, trucks, and automobiles. However, embodiments of the invention are especially suited for irrigation systems and other vehicles or systems that travel over un-paved or un-finished ground.

Figure 6:
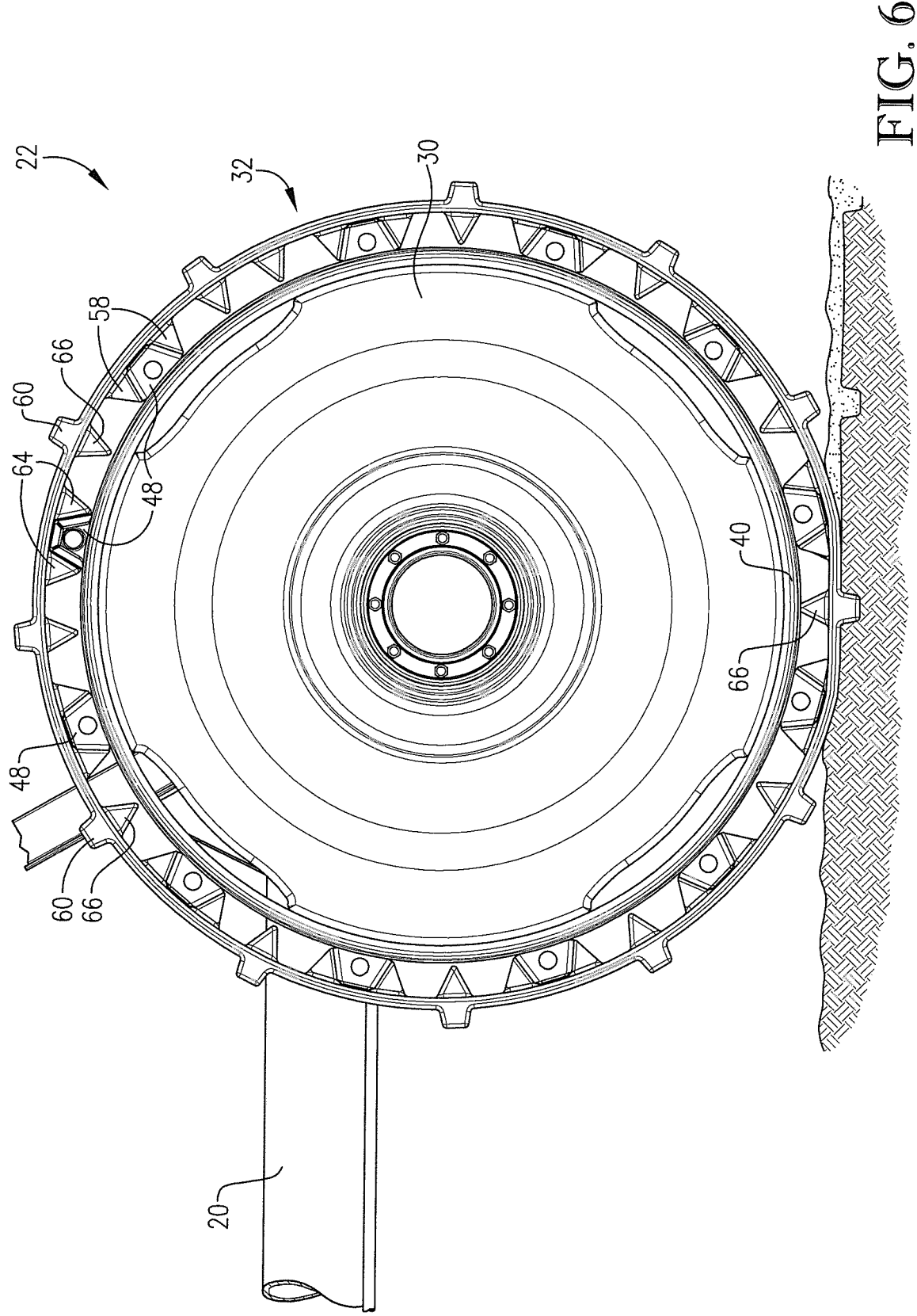
FIG. 6 is a side elevation view of the wheel assembly of FIG. 2, illustrating the wheel assembly mounted on the irrigation system of FIG. 1 and the tire flexing in response to ground engaging pressure.

Referring now to FIGS. 2-6, a wheel assembly 22 constructed in accordance with embodiments of the invention is illustrated. The wheel assembly 22 broadly includes a rigid wheel 30 and a flexible airless tire 32 mounted on the wheel 30 in a generally circumscribing relationship to the wheel 30. The wheel 30 and the tire 32 are configured such that the tire 32, while being airless, has some characteristics of a pneumatic tire that improve the performance of the tire 32. For example, the wheel 30 and tire 32 are configured such that portions of the tire 32 flex radially inwardly toward the wheel 30 in response to ground engaging pressure, as illustrated in FIG. 6. It will be appreciated that this flexing action increases the total ground engaging footprint of the wheel assembly 22, thus distributing the weight of the wheel assembly 22 and the weight of any machinery supported by the wheel assembly 22 over a larger area and limiting the total amount of ground penetration of the wheel assembly 22. Additionally, penetration of traction lugs or other ground-gripping elements of the tire is limited, as explained below in greater detail.

As used herein, "ground engaging pressure" refers to pressure exerted on the wheel assembly 22 by the ground when the wheel assembly 22 is at rest on the ground or rolling on the ground. Ground engaging pressure may include pressure exerted on the wheel assembly 22 from different directions or from multiple directions simultaneously, such as where the wheel assembly 22 is on inclined terrain or rolling over an obstacle. Ground engaging pressure is related to the weight of the wheel assembly 22 and to the weight of any machinery supported by the wheel assembly 22, and thus will vary from one embodiment of the invention to another and from one implementation to another.

Generally, the wheel 30 is configured to engage the tire 32 at circumferentially spaced locations such that portions of the tire 32 between the points of engagement flex inwardly in response to ground engaging pressure. In the illustrated embodiment, the wheel 30 includes an innermost hub 34 with a plurality of apertures 36 for attaching to, for example, lug nuts or similar attachment components. A circular or disc-shaped radial wall 38 or similar structural element connects the innermost hub 34 with a radially outer cylindrical rim wall 40. The rim wall 40 includes a first shoulder 42 corresponding to a first axial margin of the rim wall 40, a second shoulder 44 corresponding to a second axial margin of the rim wall 40, and a substantially flat transverse portion 46 interconnecting the shoulders 42,44. The rim wall 40 is generally cylindrical in shape about an axis that corresponds to an axis of rotation of the wheel assembly 22. Thus, the rim wall 40 is generally perpendicular or nearly perpendicular to the radial wall 38.

A plurality of mounting elements 48 are approximately equally spaced around the rim wall 40 and extend radially outwardly from the rim wall 40. When the tire 32 is mounted on the wheel 30 the mounting elements 48 engage portions of the tire 32 such that the tire 32 is separated radially from the rim wall 40 by a space, allowing portions of the tire 32 to flex inwardly toward the rim wall 40 in response to ground engaging pressure as explained below in greater detail.

In the illustrated embodiment, the wheel assembly 22 includes twelve mounting elements 48 approximately equally spaced around an outer periphery of the rim wall 40. Each mounting element 48 generally presents an elongated shape and is oriented transversely on the rim wall 40, that is, oriented parallel with the axis of rotation of the wheel assembly 22. Each of the illustrated mounting elements 48 includes a first side wall 50, a second side wall 52, and an outer wall 54. While each of the illustrated mounting elements 48 includes substantially flat, rectangular side walls 50,52 and outer wall 54, it will be appreciated that the particular size and shape of the mounting elements 48 is not important to the invention and may vary from one embodiment to another without departing from the spirit or scope of the invention. By way of example, each of the mounting elements 48 may be defined by a single, continuous rounded wall or a plurality of separate elements positioned to cooperatively perform the functions of the spacer elements 48 as described herein.

As explained above, the illustrated embodiment of the wheel assembly 22 includes twelve mounting elements 48 approximately equally spaced along an outer circumference of the wheel 30, or separated by an angle of approximately thirty degrees. Thus, if the rim wall 40 is about forty-eight inches in diameter, the mounting elements 48 are spaced approximately twelve and one-half inches apart. If the rim wall 40 is about fifty inches in diameter, the mounting elements 48 are spaced approximately thirteen inches apart. If the rim wall 40 is about twenty-four inches in diameter, the mounting elements 48 are spaced approximately six inches apart. These are but a few examples.

Each mounting element 48 is configured to engage the flat transverse portion 46 of the rim wall 40 and each of the first 42 and second 44 shoulders of the rim wall 40. End caps 56 may be placed on opposing ends of each mounting element 48 and secured in place with a fastener, such as a nut and bolt combination or similar fastener. Each end cap 56 includes a pair of flanges 58 for engaging drive lugs of the tire 32 to prevent lateral movement of the tire 32 relative to the wheel 30. Each pair of flanges 58 extends laterally relative to the respective mounting element 48, longitudinally relative to the rim wall 40. The end caps 56 may also perform other functions, such as preventing soil and debris from entering the mounting elements 48. The illustrated mounting elements 48 are constructed separately from the wheel 30 and may be welded or otherwise bonded or attached to the wheel 30. Alternatively, the mounting elements 48 may be integrally formed as part of the wheel 30.

The tire 32 is configured to be mounted on the wheel 30 such that at least a portion of the tire 32 engages the mounting elements 48 and the tire 32 presents a generally circular or nearly circular outer profile. Advantageously, the wheel 30 is configured for use with an airless tire. As used herein, a "tire" is a flexible component positioned and configured to engage the ground during use of the wheel assembly 22. An "airless tire" is a tire that does not require trapped or compressed air for normal and proper use. An airless tire may be constructed of a single, unitary piece of material or multiple pieces of material. For purposes of this document, a tire used with inflatable spacers (explained below) is considered airless if the tire does not otherwise use or require trapped or compressed air for normal and proper use, even if the inflatable spacers are attached to or integral with the tire.

The illustrated tire 32 is generally cylindrical in shape with a plurality of traction lugs 60 extending radially outwardly from an outer side 62 of the tire 32 and a plurality of drive lugs 64, spacers 66, or both extending radially inwardly from an inner side 68 of the tire 32. The outer side 62 of the tire 32 is generally transversely flat, that is, the outer side 62 of the tire 32 presents little or no curvature from a first edge 70 of the tire 32 to a second edge 72 of the tire 32. Similarly, the inner side 68 of the tire 32 is also generally transversely flat.

The traction lugs 60 engage the ground and help prevent the wheel assembly 22 from slipping relative to the ground. The illustrated traction lugs 60 are generally rectangular in shape and transversely oriented on the tire 32, are integrally formed with the tire 32 and may be approximately equally spaced circumferentially around the outer side 62 tire 32. As illustrated in FIG. 6, the tire 32 may be configured such that each traction lug 60 is positioned intermediate two consecutive mounting elements 48. This configuration allows the portion of the tire 32 bearing the traction lug 60 to flex inwardly in response to ground engaging pressure. This performance characteristic allows each traction lug 60 to engage the ground, yet limits the amount of ground penetration according to the amount of inward flex permitted by the spacer 66. It may be desirable in some implementations to position the traction lugs 60 proximate or in direct radial alignment with the mounting elements 48. Such alternative configurations of the tire 32 are within the ambit of the present invention.

The drive lugs 64 engage the wheel 30 and prevent the tire 32 from slipping on the wheel 30. In the illustrated embodiment, each of the drive lugs 64 is integrally formed in the tire 32 and presents a generally elongated body with a triangular cross section, transversely oriented on the tire 32. A pair of drive lugs 64 engages either side of each mounting element 48, wherein sides of the drive lugs 64 are configured and angled for optimal contact with the angled side walls 50,52 of the mounting elements 48. Because a drive lug 64 is positioned on each side of each mounting element 48, the drive lugs 64 engage the mounting element 48 and prevent the tire 32 from rotating relative to the wheel 30 regardless of whether the wheel 30 is moving in a forward or reverse direction. Similarly, the flanges 58 of the mounting element end caps 56 engage axial ends of the drive lugs 64 and prevent the tire 32 from shifting axially relative to the wheel 30.

The plurality of spacers 66 extend inwardly from the inner side 68 of the tire 32 and regulate the amount of inward flex of the tire 32. In the illustrated embodiment, the spacers 66 are integrally formed as part of the tire 32 and are similar in size and shape to the drive lugs 64, and each spacer 66 is positioned to be in radial alignment with one of the traction lugs 60. As best illustrated in FIG. 6, as the tire 32 flexes inward in response to ground engaging pressure, a spacer 66 limits the inward flex as the spacer 66 contacts the rim wall 40. While the spacers 66 of the illustrated embodiment are similarly configured to the drive lugs 64, it will be appreciated that the spacers 66 may be of various sizes and shapes without departing from the spirit or scope of the present invention. Particularly, the spacers 66 may be configured according to a particular size to allow the tire to flex inwardly a desired amount. Similarly, the spacers 66 need not be aligned axially with the traction lugs 60, but may be offset from the position in the illustrated embodiment. Such a configuration may be desirable, for example, to further regulate the performance of the traction lugs 60 when the tire 32 flexes in response to ground engaging pressure.

The tire 32 may be configured such that as the tire 32 flexes inwardly toward the wheel 30, the flexed portion of the tire 32 remains transversely flat or substantially transversely flat. This may be desirable, for example, to preserve a wide footprint or otherwise limit the amount of ground penetration.

The tire 32 may be mounted on the wheel 30 according to any of various methods. For example, the tire 32 may be press fitted to the wheel 30, wherein the tire 32 must be expanded or stretched to be placed over the wheel 30 and remains partially stretched while mounted on the wheel 30. If the tire 32 is press fitted to the wheel 30, tension remaining in the tire 32 after it is mounted on the wheel 30 helps retain the tire 32 on the wheel 30, in addition to the mounting element end caps 58, as explained above. Alternatively, the tire 32 may be loose fitted on the wheel 30, wherein the tire 32 is of an appropriate size relative to the wheel 30 that the tire 32 need not be stretched for placement on the wheel 30 but may be slid onto the wheel 30. If the tire 32 is loose fitted to the wheel 30, little or no tension remains in the tire 32 once it is mounted on the wheel 30 such that the mounting element end caps 58 or similar elements may be required to hold the tire 32 in place on the wheel 30. In some embodiments, the tire 32 may be bonded to the wheel 30, although bonding presents some disadvantages, namely, the tire 32 cannot be easily removed for repair or replacement.

The tire 32 is constructed of a flexible material, such as rubber, PVC or plastic. The tire 32 may further include reinforcing elements that limit stretch and strengthen the tire 32. Such reinforcing elements may include, for example, fabric webbing or steel belts. The tire 32 may be sufficiently resilient that it retains a circular shape along portions of the tire 32 not supported by the mounting elements 48.

The wheel 30 is constructed of a rigid material such as, for example, metal, plastic or a composite material. The size of the wheel assembly 22 may vary substantially from one embodiment of the invention to another without departing from the scope of the invention. Dimensions and ranges of various preferred embodiments will now be discussed with the understanding that the dimensions and ranges are exemplary, and not limiting, in nature. The diameter of the wheel 30, including the mounting elements 48, is preferably within the range of from about twenty-four inches to about sixty inches and more preferably within the range of from about thirty-six inches to about forty-eight inches. The width of the wheel 30 is preferably within the range of from about six inches to about eighteen inches and more preferably within the range of from about eight inches to about sixteen inches. The height of the mounting elements 48 is preferably within the range of from about one inch to about four inches, more preferably within the range of from about two inches to about three inches.

The thickness of the tire 32, excluding the traction lugs 60, is preferably within the range of from about one-half inch to about three inches, more preferably within the range of from about one inch to about two inches. The height of the traction lugs 60 is preferably within the range of from about one-quarter inch to about four inches, more preferably within the range of from about one-half inch to about three inches. In one exemplary embodiment, the wheel assembly 22 is about eleven inches wide and about fifty-two inches in diameter.

Figure 7:
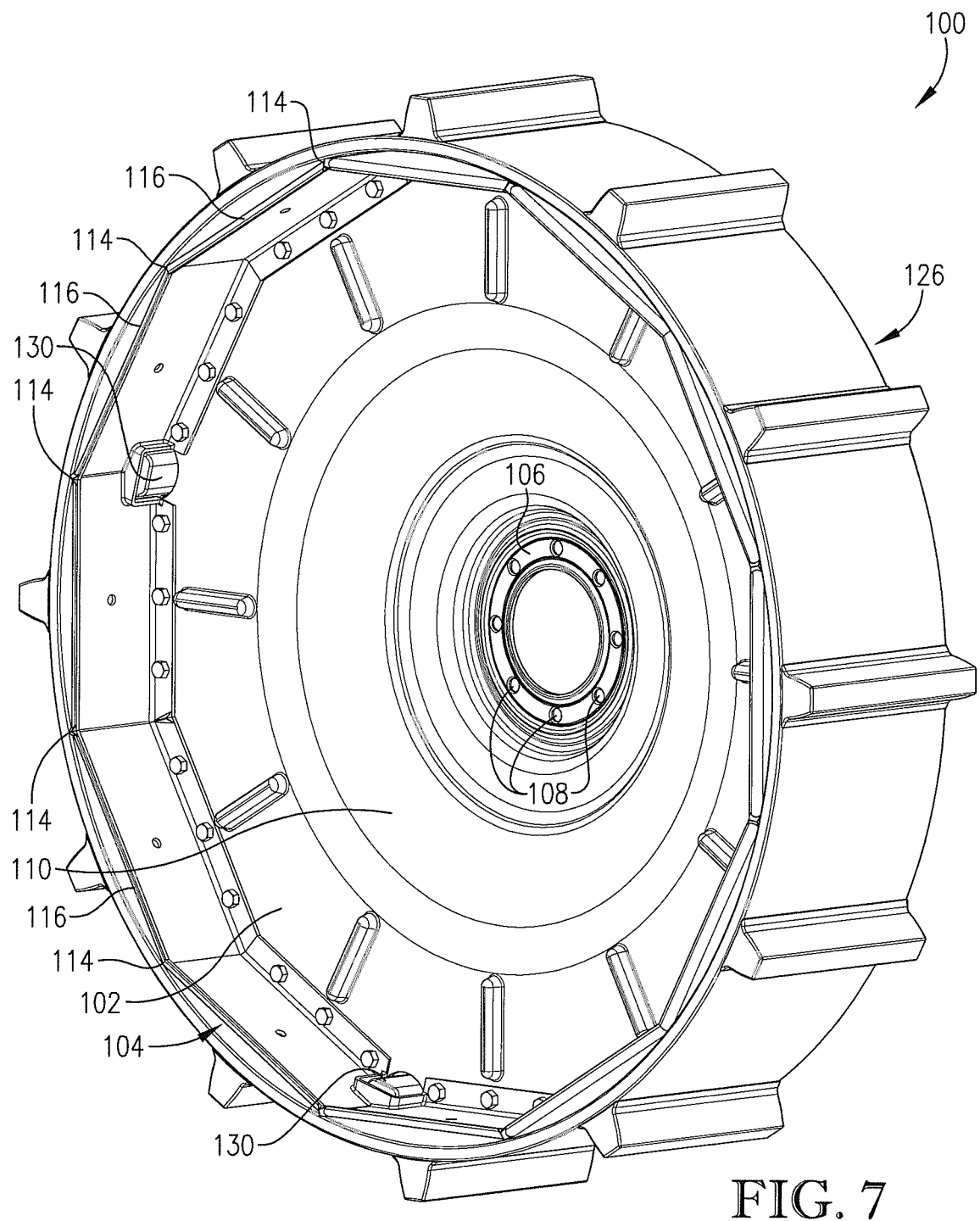
FIG. 7 is a side perspective view of a wheel assembly constructed according to another embodiment of the invention, the wheel assembly including a rigid wheel with a polygonal outer rim wall and a flexible airless tire mounted on the wheel.

Turning now to FIGS. 7-9, a wheel assembly 100 constructed according to an alternative embodiment of the invention is illustrated. The wheel assembly 100 is similar in size, shape and function to the wheel assembly 22 described above, except that the wheel assembly 100 includes a wheel 102 with a radially outer rim wall 104 presenting a polygonal shape.

The wheel 102 includes an innermost hub 106 with a plurality of apertures 108 for attaching to, for example, lug nuts or similar attachment components. A disc-shaped radial wall 110 or similar structural element extends radially outwardly from the hub 106 and includes peripheral apertures 112 for attaching to elements of the rim wall 104.

The rim wall 104 is defined by a plurality of outermost vertices 114 connecting a plurality of planar faces 116. In the illustrated embodiment, the rim wall 104 is defined by twelve vertices 114 connecting twelve faces 116. The rim wall 104 comprises four sections 118a corresponding to a first side of the wheel 102 and four sections 118b corresponding to a second side of the wheel 102.

Each section 118a,b defines a portion of each of three consecutive faces and a portion of a lug aperture 120. Each section 118a cooperates with a corresponding section 118b from the opposite side to fully define the three consecutive faces and the lug aperture. Each section 118a,b also includes one or more inwardly-extending flanges 122 corresponding to an axially inner edge of the section 118a,b and including attachment apertures 124 corresponding to the peripheral apertures 112 of the radial wall 110 for attaching the sections to the radial wall 110.

Figure 9A:
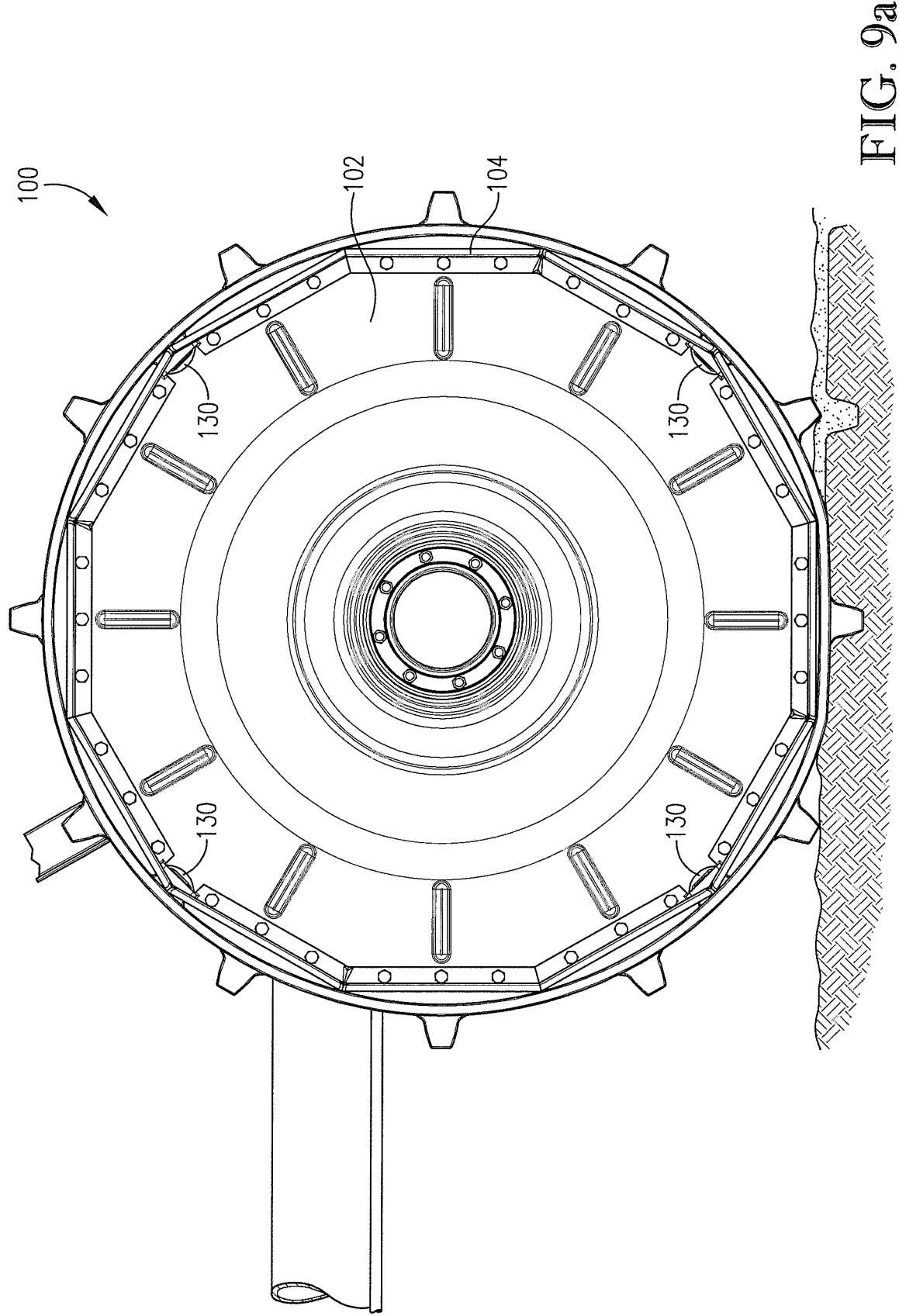
FIG. 9a is a side elevation view of the wheel assembly of FIG. 7, illustrating the wheel assembly mounted on the irrigation system of FIG. 1 and the tire flexing in response to ground engaging pressure.

When the wheel 102 is assembled the vertices 114 are the outermost structural elements of the wheel 102. The wheel 102 is configured such that the tire 126 engages and is supported by the vertices 114 of the rim wall 104 and portions of the tire 126 between the vertices 114 are separated from the faces 116 by a space. Portions of the tire 126 between the vertices 114 are configured to flex inwardly toward the faces 116 in response to ground engaging pressure, as illustrated in FIG. 9a. The wheel 102 need not include mounting elements, as the tire 126 is mounted on the vertices 114 of the rim wall 104. The lug apertures 120 are used to secure the tire 126 to the wheel 102 such that the tire 126 does not rotate or shift laterally relative to the wheel 102.

Figure 9B:
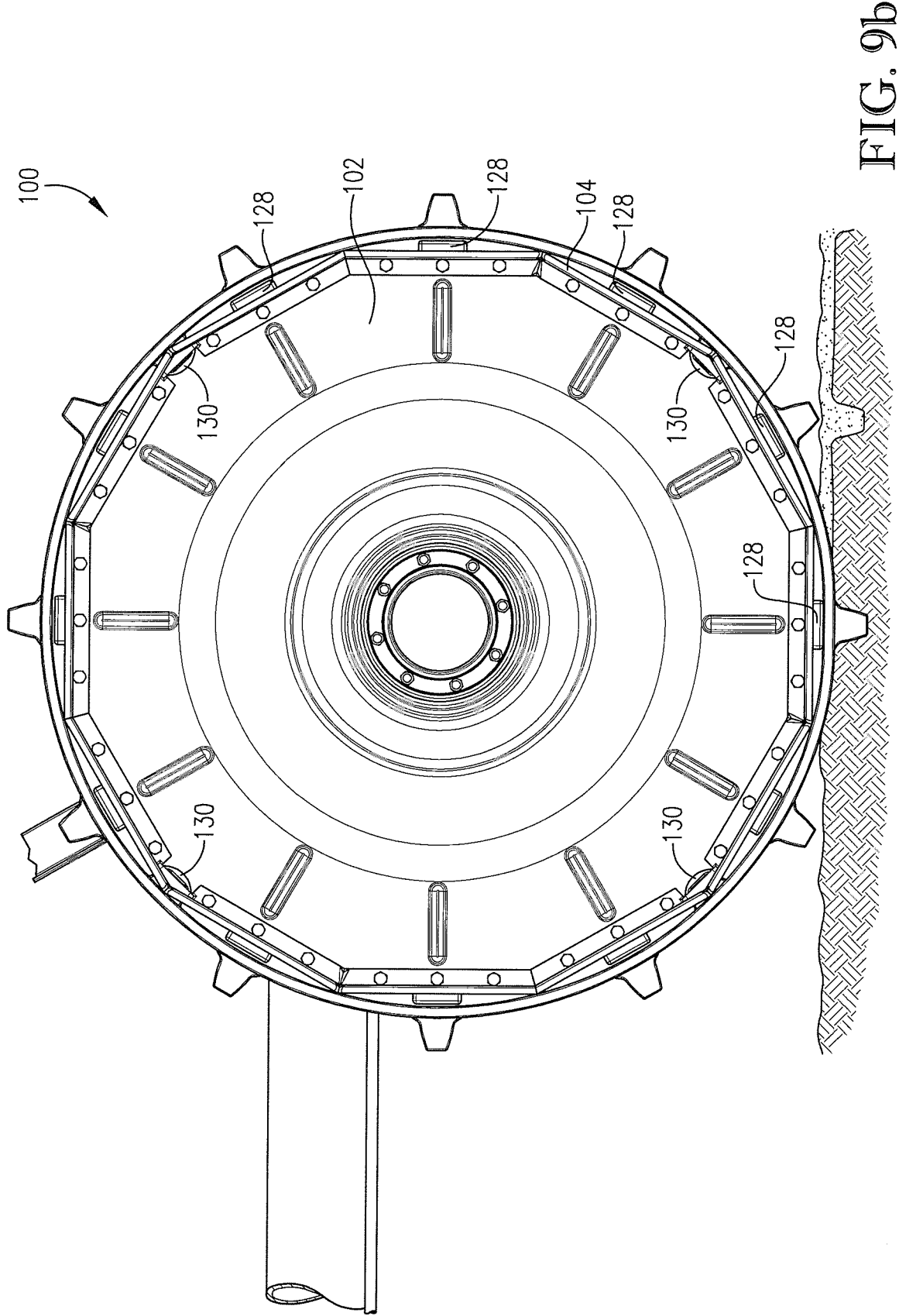
FIG. 9b is a side elevation view of the wheel assembly of FIG. 9a, the wheel assembly including spacers between the wheel and the tire, the spacers limiting the amount the tire flexes in response to the ground engaging pressure.
Figure 10:
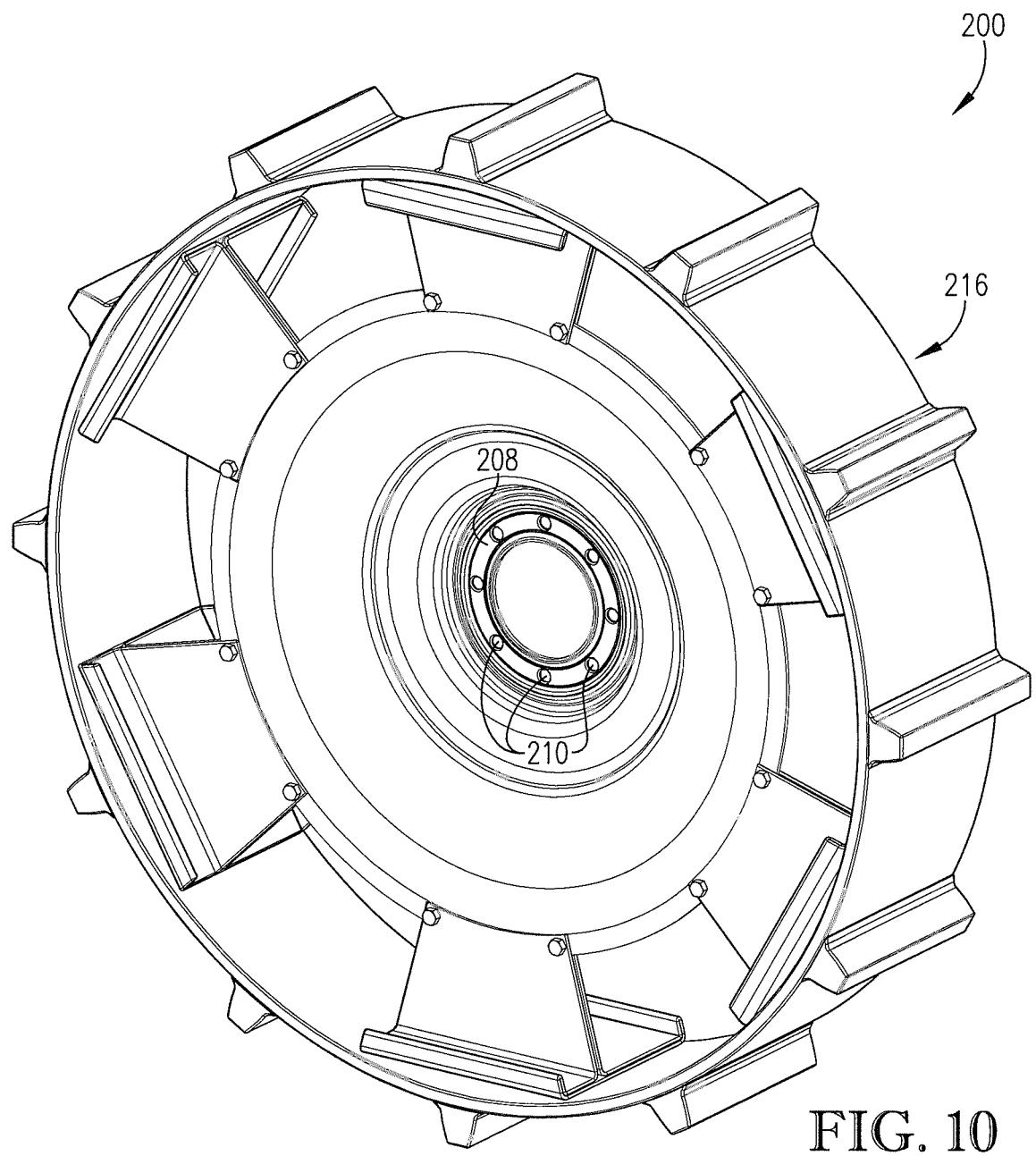
FIG. 10 is a side perspective view of a wheel assembly constructed according to another embodiment of the invention, the wheel assembly including a rigid wheel presenting a hub and spoke configuration and a flexible airless tire mounted on the wheel.
Figure 11:
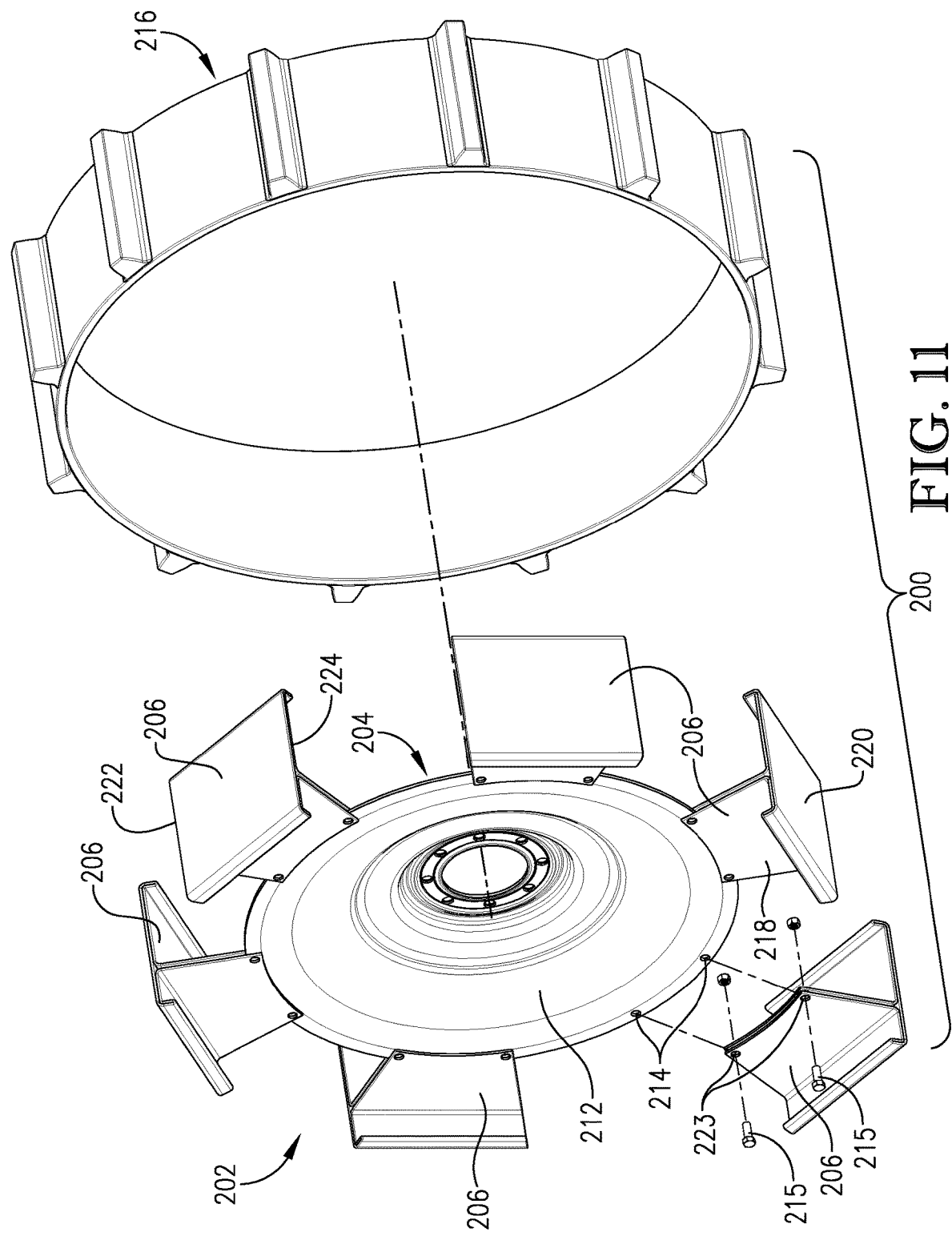
FIG. 11 is an exploded view of the wheel assembly of FIG. 10.

A plurality of spacers 128 may be interposed between the wheel 102 and the tire 126 to regulate the degree to which the tire 126 flexes in response to ground engaging pressure. In particular, the spacers 128 may be positioned on the faces 116 at approximately a midpoint between consecutive vertices 114 where separation of the tire 126 from the wheel 102 is the greatest. As illustrated in FIG. 9b, the spacers 128 are attached to the wheel 102 and, as explained below, may be removably attached to the wheel 102.

The tire 126 is similar to the tire 32 described above, except that the tire 126 includes four drive lugs 130 for engaging the drive lug apertures 120 of the rim wall and may not include spacer elements attached thereto or integrally formed in the tire 126. The four drive lugs 130 may be integrally formed with the tire 126 and are approximately equally spaced around an inner side 132 of the tire 126. The drive lugs 130 are configured and positioned to engage the lug apertures 120 of the wheel 102. The tire 126 may be positioned on the wheel 102 such that each traction lug 130 is positioned approximately over a center of a face 116 and in radial alignment with a spacer 128, if spacers are present.

Turning now to FIGS. 10-12a, a wheel assembly 200 constructed according to another embodiment of the invention is illustrated. The wheel assembly 200 is similar to the wheel assembly 100 described above, except that the wheel assembly 200 includes a wheel 202 defined by a hub and spoke configuration. In particular, the wheel 202 comprises a hub 204 and a plurality of spoke elements 206 extending radially outwardly from the hub 204. The hub 204 includes an inner hub ring 208 with a plurality of apertures 210 for attaching to, for example, lug nuts or similar attachment components. A disc-shaped radial wall 212 or similar structural element extends radially outwardly from the inner hub ring 208. The radial wall 212 includes a plurality of outer peripheral apertures 214 configured to receive fasteners 215 therethrough for attaching the plurality of spoke elements 206 to the radial wall 212. The spoke elements 206 extend radially outwardly from the radial wall 212 and support the tire 216.

The illustrated embodiment includes six spoke elements 206 approximately equally spaced around the radial wall 212. Each spoke element 206 includes a planar radial portion 218 and a planar transverse portion 220 that together form a T-shaped cross section. The planar radial portion 218 includes a proximal end 219 for attaching the spoke elements 206 to the radial wall 212 and an opposing distal end 221 such that the planar radial portion 218 extends radially outwardly toward the transverse portion 220. The proximal end 219 may include apertures 223 for receiving fasteners 215 therethrough. The planar radial portion 218 may annularly widen from the proximal end 219 to the distal end 221. Each transverse portion 220 represents a radially outer, rectangular planar face that lies in a plane that is approximately parallel with an axis of rotation of the wheel assembly 200.

Figure 12A:
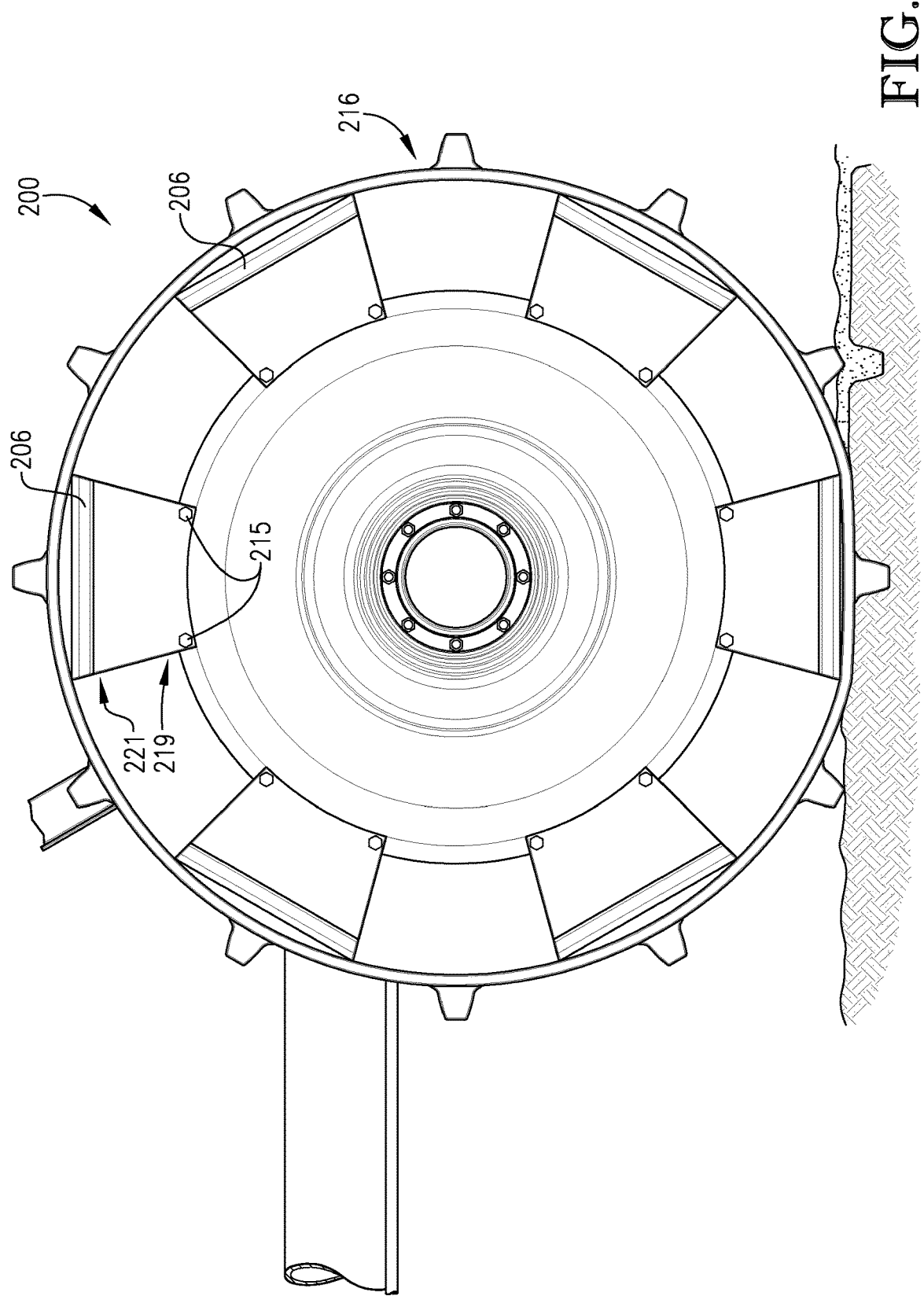
FIG. 12a is a side elevation view of the wheel assembly of FIG. 10, illustrating the wheel assembly mounted on the irrigation system of FIG. 1 and the tire flexing in response to ground engaging pressure.
Figure 12B:
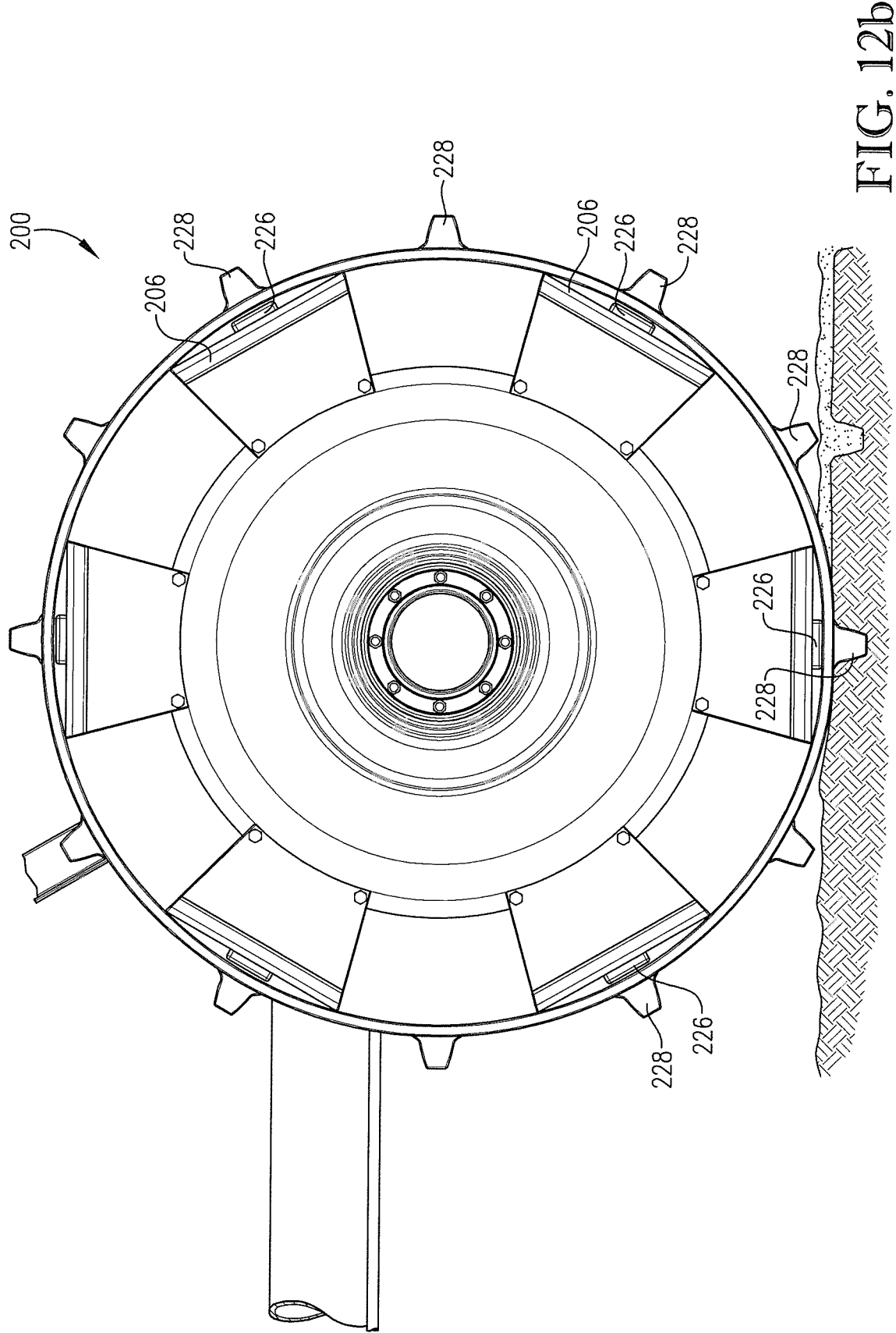
FIG. 12b is a side elevation view of the wheel assembly of FIG. 12a, the wheel assembly including spacers between wheel spokes and the tire, the spacers limiting the amount the tire flexes in response to the ground engaging pressure.

The tire 216 may be similar to the tire 126 described above. The tire 216 is mounted on the spoke elements 206 and engages opposing forward 222 and trailing 224 edges of the transverse portion 220 of each spoke element 206. The edges 222,224 support the tire 216 and portions of the tire 216 between consecutive spoke elements 206 and between the edges 222,224 of each spoke element 206 flex inwardly toward a center of the wheel 202 in response to ground engaging pressure, as illustrated in FIG. 12a. Spacers 226 may be placed between the spoke elements 206 and the tire 216, as illustrated in FIG. 12b, thus limiting the amount of inward flex of the tire toward the face of each spoke element.

Portions of the tire 216 between the spoke elements 206 may flex inwardly more than portions of the tire 216 corresponding to the spoke elements 206, particularly if spacers 226 are present on the spoke elements 206. This may result in traction lugs 228 positioned in alignment with the spoke elements 206 experience greater ground penetration than traction lugs 228 positioned between the spoke elements 206.

A first, outer diameter of the wheel 202 including the spoke elements 206 is greater than a second, inner diameter of the wheel 202 not including the spoke elements 206. By way of example, the inner diameter may be about 25% of the outer diameter, may be about 50% of the outer diameter, or may be about 75% of the outer diameter.

Figure 13:
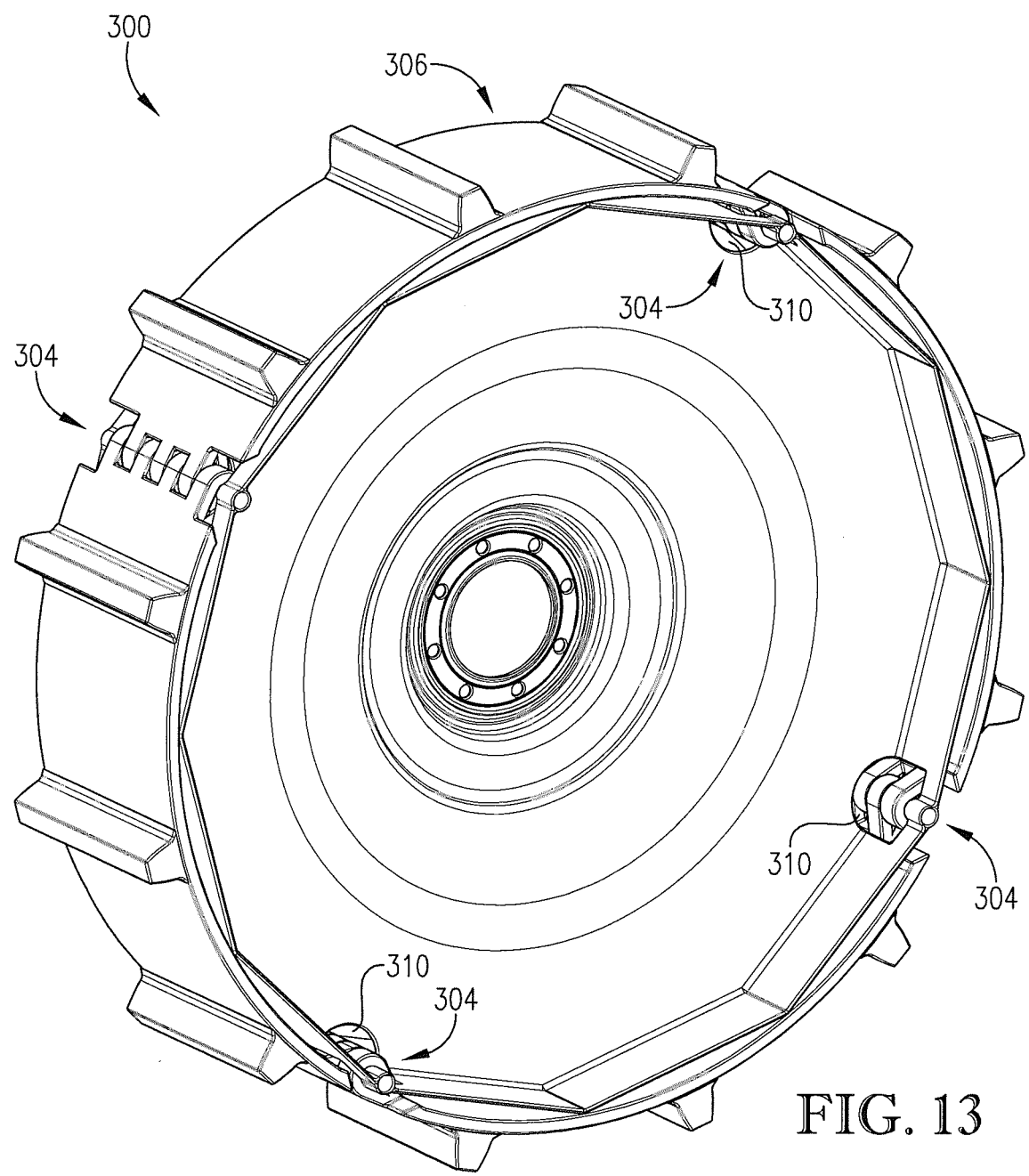
FIG. 13 is a side perspective view of a wheel assembly constructed according to another embodiment of the invention, the wheel assembly including a modular airless tire.
Figure 14:
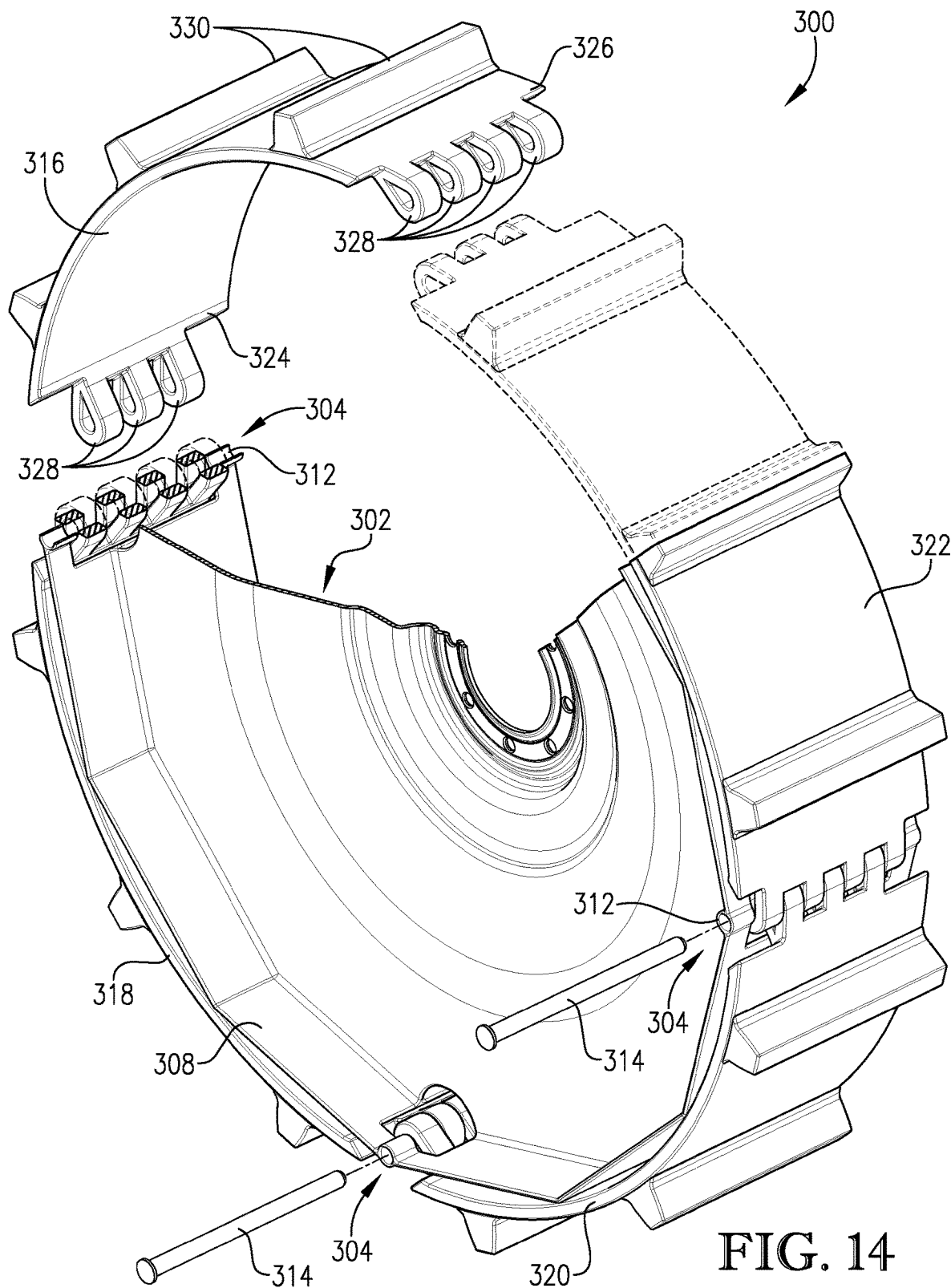
FIG. 14 is a fragmented, partially exploded view of the wheel assembly of FIG. 13.

Turning now to FIGS. 13-14, a wheel assembly 300 constructed according to another embodiment of the invention is illustrated. The wheel assembly 300 is similar in size, shape and function to the wheel assembly 100 described above, except that the wheel assembly 300 includes a wheel 302 with a plurality of attachment points 304 for attaching modular portions of a tire 306 to the wheel 302. More particularly, the wheel 302 includes four attachment points 304 approximately equally spaced around a radially outer rim wall 308 of the wheel 302. Each attachment point 304 corresponds to a vertex of the rim wall 308 and includes an aperture 310 and a pair of eyelets 312. The eyelets 312 are positioned in axial alignment on opposing axial margins of the rim wall 308 to receive a pin 314.

The tire 306 is similar in size and shape to the tire 126 describe above, except that the tire 306 comprises a plurality of separate tire sections 316,318,320,322. Each of the tire sections 316-322 corresponds to a circumferential portion of the tire 306, in the illustrated embodiment each section 316-322 corresponds to about one-fourth of the circle defined by the tire, or about ninety degrees of curvature of the tire 306. The tire sections 316-322 may be removably attached to the wheel 302 and, when attached to the wheel 302, generally form a circular shape in circumscribing relationship to the wheel 302.

Each of the tire sections 316-322 may be identically configured, therefore only section 316 will be described in further detail with the understanding that the other sections 318,320,322 may be similarly or identically configured. A first end 324 of the section 316 and a second end 326 of the section 316 each include a plurality of loops 328 in axial alignment and configured to receive a pin 314. When the tire section 316 is attached to the wheel 302, the loops 328 of the first end 324 are interdigitated with end loops 328 of section 318 and positioned in axial alignment with the eyelets 312 of the attachment point 314 and the end loops 328 of section 318 such that a pin 314 may be inserted through the eyelets 312 and the loops 328 of both sections 316,318, thereby securing the loops 328 in place. The second end 326 of the section 316 is similarly secured to an attachment point 304 with an end of section 322.

Because each tire section 316-322 is secured to the wheel 302 via a pin 314, drive lugs are not necessary. Thus, an inner side of each of the tire sections 316-322 may be substantially smooth while an outer side may include traction lugs 330 similar to the traction lugs 60 described above. While the illustrated modular tire 306 includes four sections 316-322, it will be appreciated that the tire 306 may comprise more than four sections or fewer than four sections. By way of example and not limitation, the modular tire 306 may include only two sections, three sections, or five sections. Furthermore, the wheel assembly 300 may include spacers (not shown) positioned between the tire 306 and the wheel 302 to regulate the flexing action of the tire 306. Such spacers may be attached to the wheel 302 or the tire 306.

Figure 15:
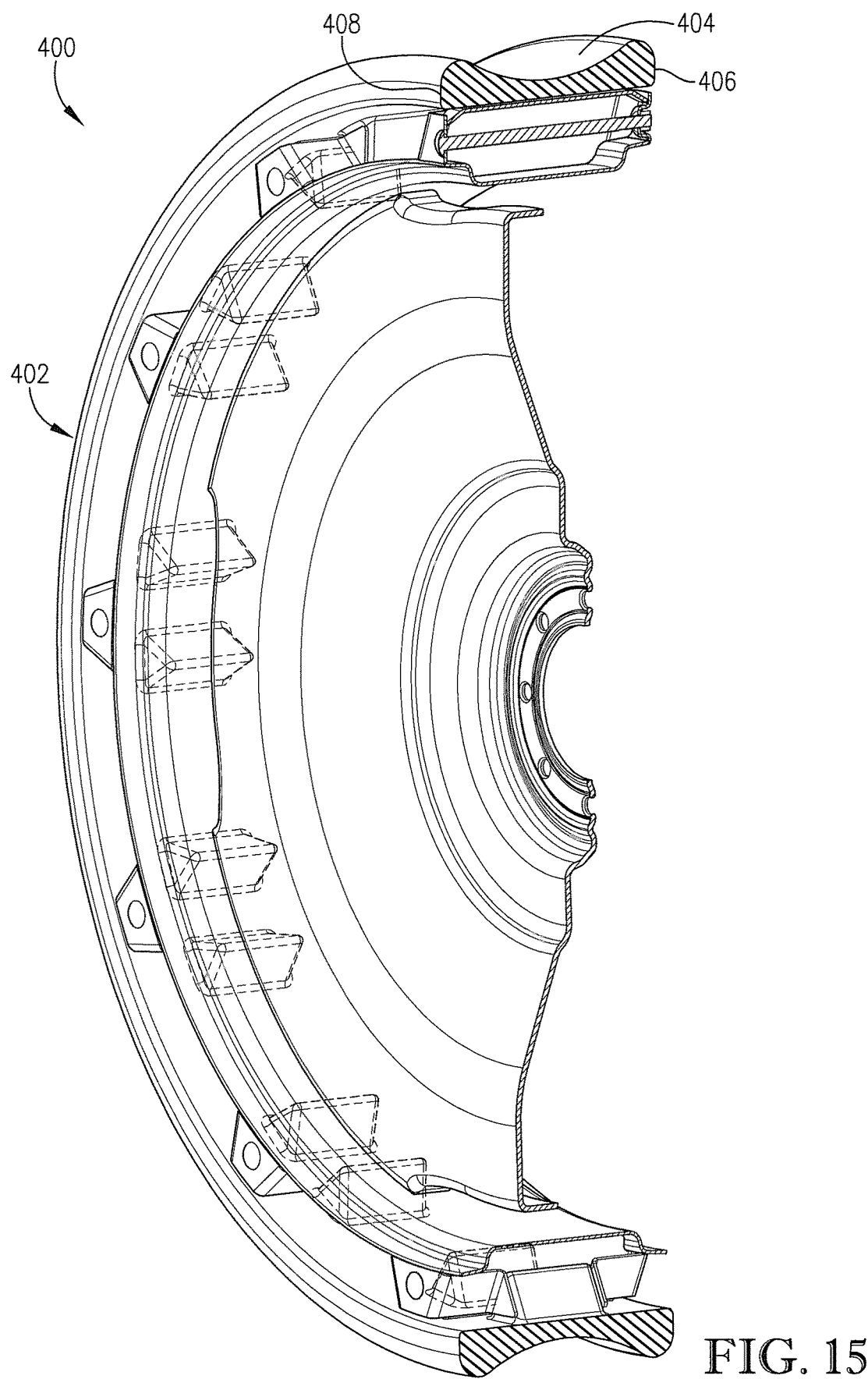
FIG. 15 is a cross-sectional view of a wheel assembly constructed according to another embodiment of the invention, the wheel assembly including a tire presenting a transversely concave outer side.

FIG. 15 illustrates a wheel assembly 400 constructed according to another embodiment of the invention. The wheel assembly 400 is similar in size, shape and function to the wheel assembly 22 described above, except that the wheel assembly 400 includes a tire 402 with an outer side 404 that is transversely concave. In other words, the outer side 404 of the tire 402 presents a concave profile between a first edge 406 and a second edge 408. The tire 402 also differs from the tire 32 in that the tire 402 does not include traction lugs. In the illustrated embodiment, the concave profile results from the tire 402 being thicker on the edges 406,408 than in a middle portion between the edges 406,408. Such a configuration may be desirable, for example, to prevent the lateral displacement of soil beneath the tire 402.

Turning now to FIGS. 16-18, a wheel assembly 500 constructed according to another alternative embodiment of the invention is illustrated. The wheel assembly 500 includes a wheel 502 and a tire 504 and is similar to the wheel assembly 22 described above, except that the wheel assembly 500 includes spacers that are interchangeable, adjustable, or both. Removing, exchanging or adjusting the spacers may be desirable to adjust the amount the tire flexes. If the wheel assembly 500 will be used in an environment with softer ground, it may be desirable to use smaller spacers that allow greater inward flex to increase the ground engaging footprint of the wheel assembly 500, decrease penetration of the traction lugs, or both. Similarly, if the wheel assembly 500 will be used in an environment with harder ground, it may be desirable to use larger spacers that allow less inward flex to decrease the ground engaging footprint of the wheel assembly 500, increase penetration of the traction lugs, or both.

In a first configuration illustrated in FIGS. 16a and 16b, the wheel assembly 500 includes interchangeable spacers 506,508. A first set of spacers 506 are larger and may be removed and replaced with a second, smaller set of spacers 508. Each of the spacers 506,508 is elongated with a generally rectangular cross section and is oriented generally transversely on the wheel 502. The spacers 506,508 may be removably attached to the wheel 502 using any of various removable fasteners such as, for example, a nut and bolt combination.

Figure 17A:
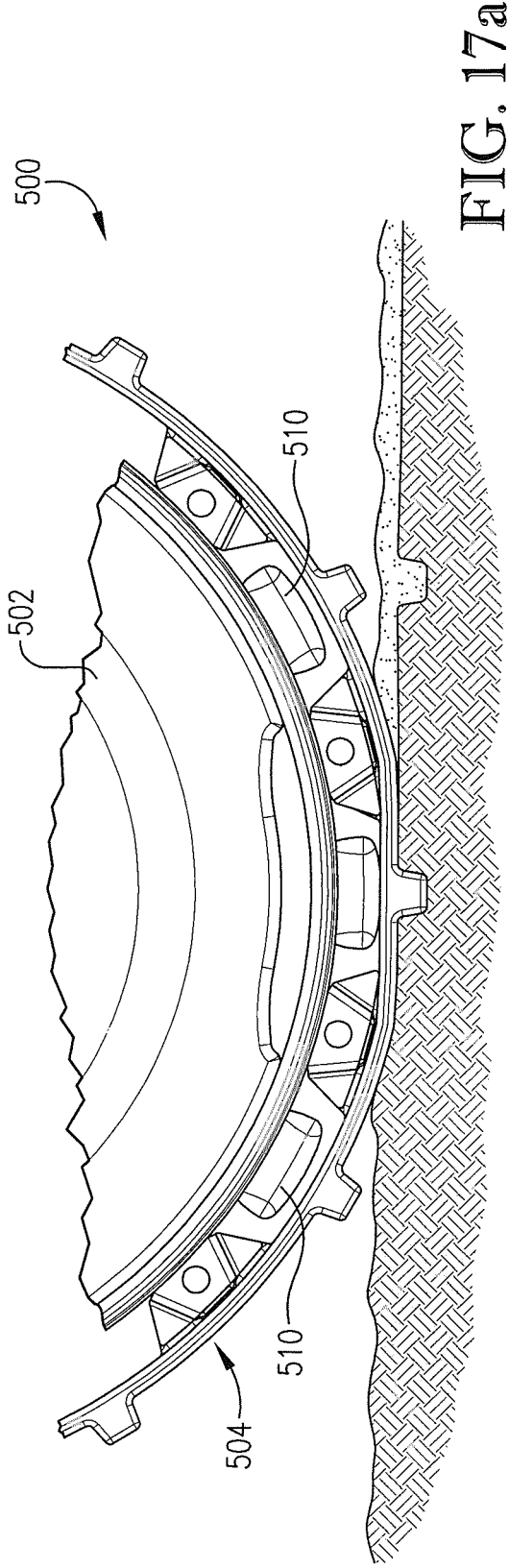
FIG. 17a is a fragmented side elevation view of a wheel assembly constructed according to another embodiment of the invention, the wheel assembly including a rigid wheel and a flexible airless tire and further including a plurality of inflatable spacers interposed between the wheel and the tire, the spacers being inflated to a first, large size.
Figure 17B:
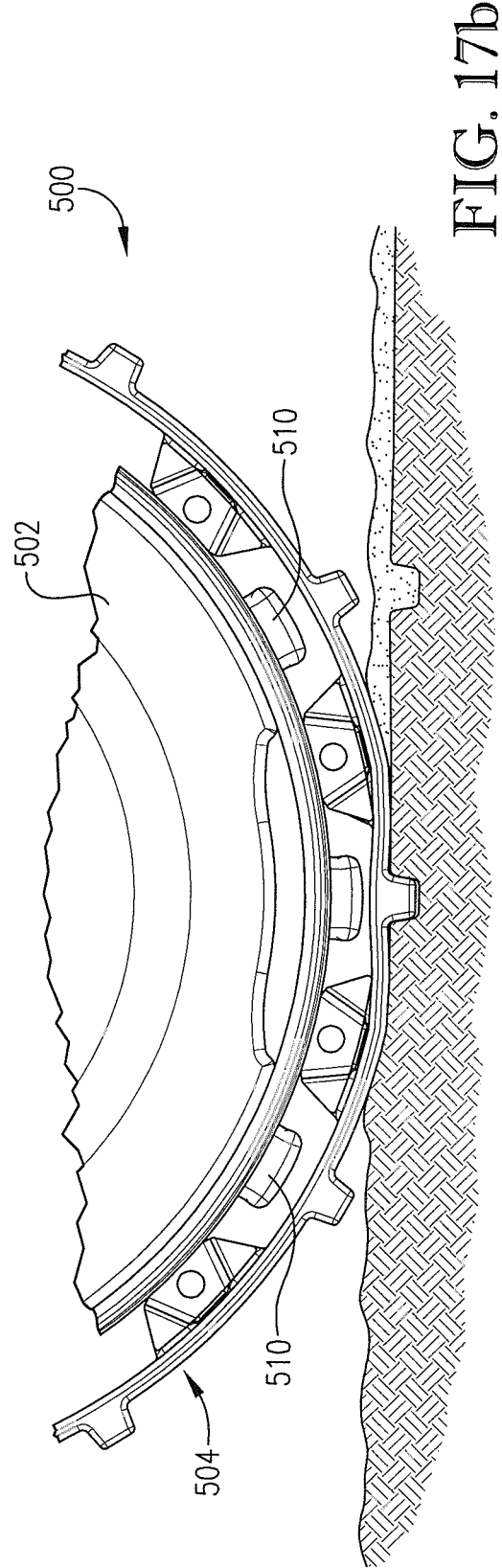
FIG. 17b is a fragmented side view of the wheel assembly of FIG. 17a, the spacers being inflated to a second, small size.

In a second configuration illustrated in FIGS. 17a and 17b, the wheel assembly 500 includes adjustable spacers 510. The spacers 510 are secured to the wheel 502 in radial alignment with the traction lugs and are adjustable between a first, larger size (FIG. 17a) and a second, smaller size (FIG. 17b). Adjusting the spacers between the first size and the second size may be performed without removing the spacers 510 from the wheel assembly 500. By way of example, the adjustable spacers 510 may be inflatable such that inflating the spacers 510 causes them to enlarge and deflating the spacers causes them to decrease in size. Alternatively or additionally, adjusting the air pressure in the spacers 510 may alter the hardness or flexibility of the spacers 510, such that increasing air pressure hardens the spacers 510 and decreases the amount of inward flex of the tire 504 and decreasing air pressure softens the spacers 510 and increases the amount of inward flex of the tire 504.

Each of the spacers 510 is adjustable separately from the other spacers, wherein each of the spacers 510 may include a valve and valve stem (not shown) similar or identical to a conventional valve and a valve stem used on a pneumatic tire. Alternatively, a single spacer component 512 with a plurality of inflatable sections 514 may be used. The spacer component 512 functions similarly to spacers 510, except that the inflatable sections 514 are in fluid communication such that all of the sections 514 are inflated simultaneously as a single unit. A recess or break in each of the mounting elements 516 my accommodate a portion of the spacer component 512 enabling fluid communication between sections 514. For example, the spacer component 512 may take the form of an inflatable tube with a single inflatable chamber comprising all of the sections 514. Alternatively, the inflatable sections 514 may be interconnected via rigid channels in the spacer component 512 that permit fluid flow therethrough.

It will be observed that the combination of the tire 504 and the single spacer component 512 described above is similar in some respects to a traditional pneumatic tire or tube/tire assembly in form and function. Specifically, the spacer component 512 is configured to be inflated and deflated as a single unit, is interposed between the tire and the wheel, and regulates the inward flex of portions of the tire during operation. One notable difference between the wheel assembly 500 with the spacer component 512 and a conventional pneumatic tire is that the tire 504 is supported by the mounting elements 516 and the spacer component 512 only regulates the inward flex of certain portions of the tire 504. Another notable difference between the wheel assembly 500 with the spacer component 512 and a conventional pneumatic tire is that the wheel assembly 500 is configured for normal operation even if the spacer component 512 is completely deflated. Thus, if the spacer component 512 should become damaged or otherwise deflate unexpectedly during use, the wheel assembly 500 would continue to operate without sustaining damage and with minimal impact on the performance of the wheel assembly 500.

Figure 19:
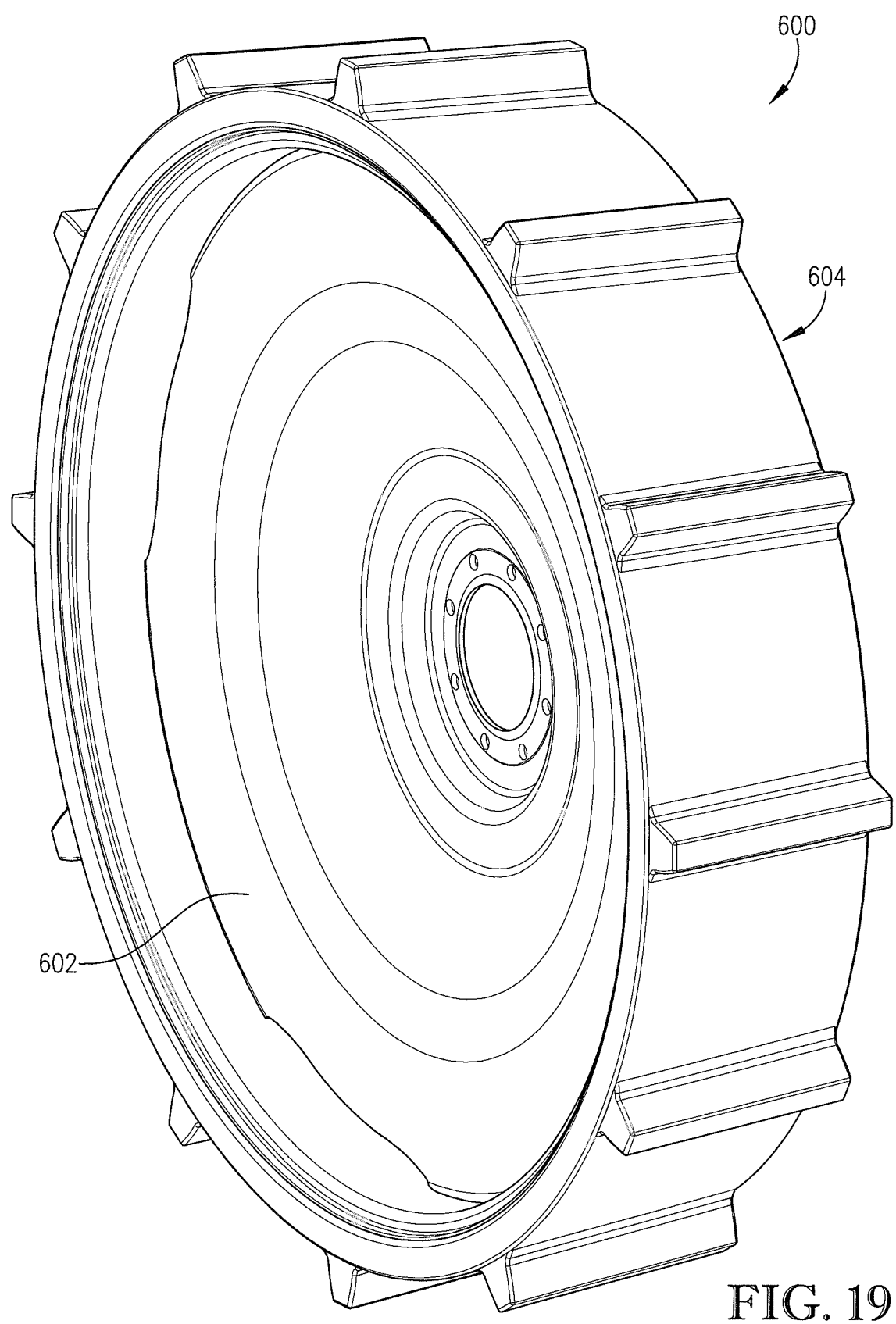
FIG. 19 is a side perspective view of a wheel assembly constructed according to another embodiment of the invention, the wheel assembly presenting an outer side with a truncated conical shape.
Figure 20:
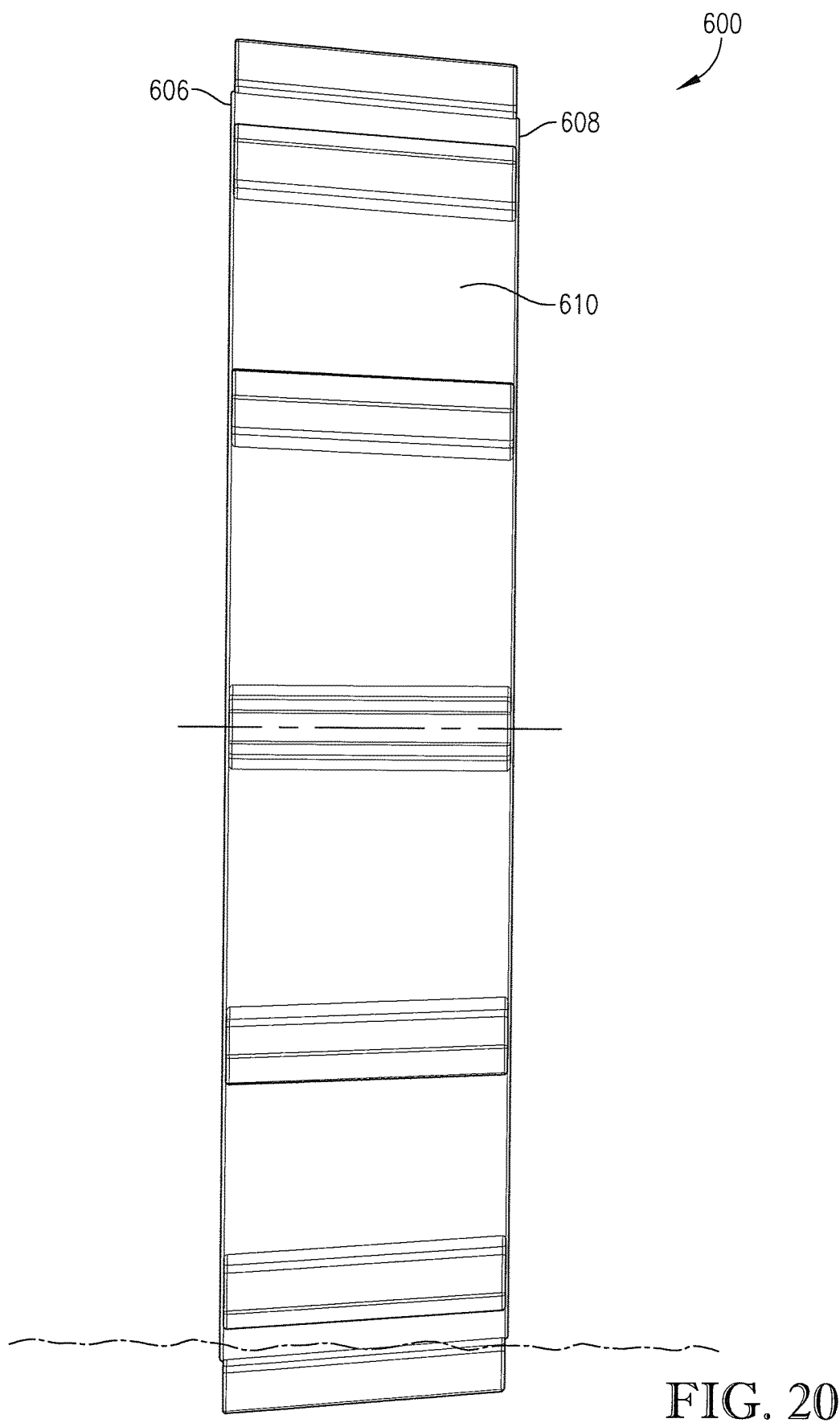
FIG. 20 is an end elevation view of the wheel assembly of FIG. 19.
Figure 21:
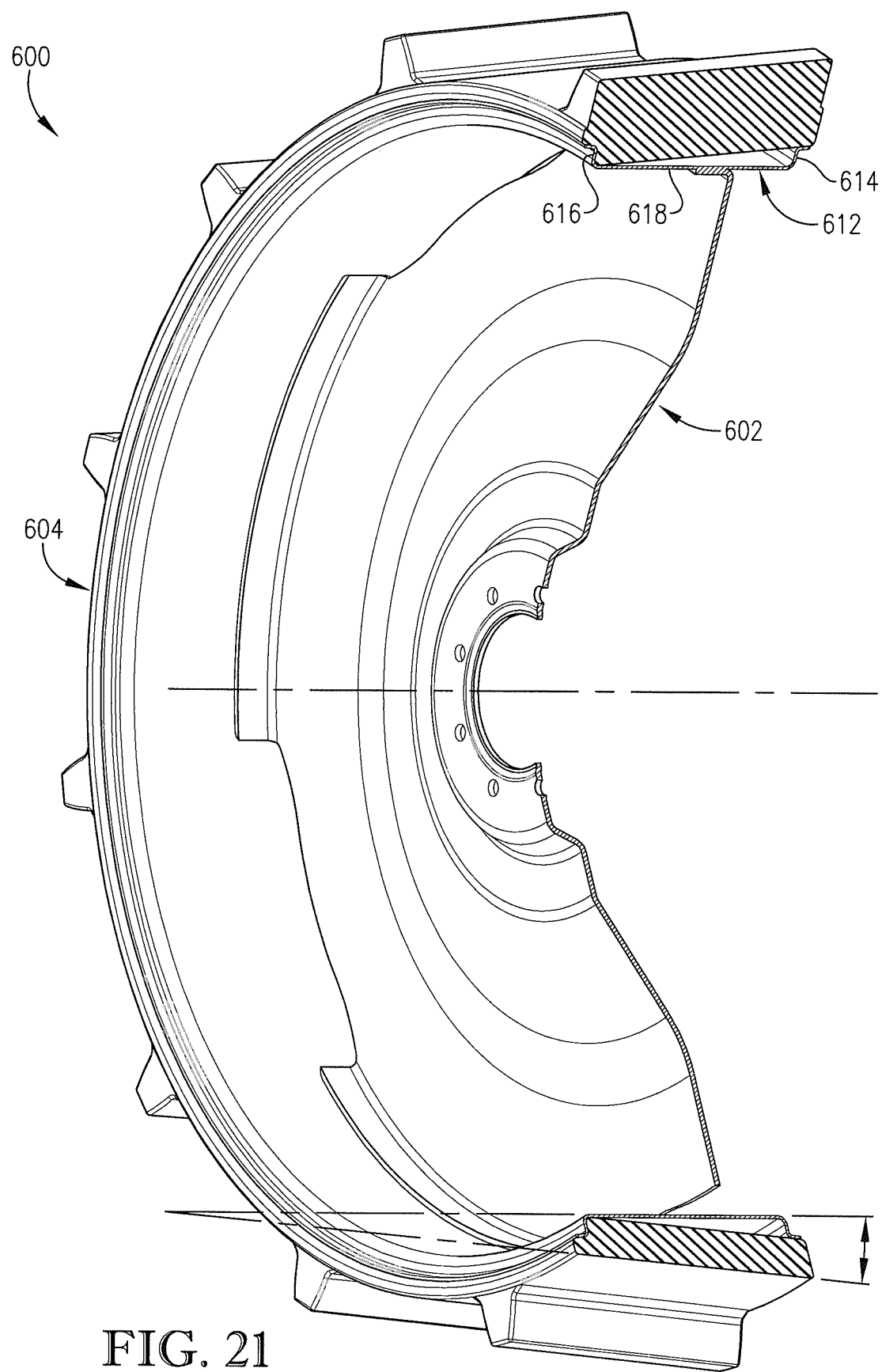
FIG. 21 is a fragmented, side perspective view of the wheel assembly of FIG. 19.

Turning now to FIGS. 19-21, a wheel assembly 600 constructed according to another alternative embodiment of the invention is illustrated. The wheel assembly 600 includes wheel 602 that is similar to the wheel 30 except that the wheel 602 does not have mounting elements. The wheel assembly 600 also includes a tire 604 that is similar to the tire 32 except that the tire 604 does not include spacer elements or drive lugs, and the tire 604 presents a truncated conical outer shape wherein a first edge 606 of the tire 604 presents a larger outer diameter than a second edge 608 of the tire 604. An outer side 610 of the tire 604 slopes radially inwardly from the first edge 606 to the second edge 608 along a straight or arcuate path.

The truncated conical configuration may be achieved through design configurations associated with the wheel 602, the tire 604 or both. In the illustrated embodiment, the wheel 602 includes a radially outer rim wall 612 similar or identical to the rim wall 40 described above, wherein the rim wall 612 defines a cylinder about an axis that corresponds to an axis of rotation of the wheel assembly 600. The rim wall 612 includes first 614 and second 616 shoulders and a transverse portion 618 intermediate the shoulders 614,616. The tire 604 is configured such that a first axial margin of the tire 604 corresponding to the first edge 606 rests on the first shoulder 614 and is separated from the transverse portion 618 by a space. A second axial margin of the tire 604 corresponding to the second edge 608 rests in part on the transverse portion 618 of the rim wall 612 proximate the second shoulder 616. This is but one, exemplary configuration of the wheel assembly 600.

The slope of the outer side 610 of the tire 604 relative to the axis of rotation of the wheel assembly 600 is preferably within the range of from about 0.01 to about 1.0, and more preferably within the range of from about 0.05 to about 0.5 and may particularly be about 0.1, about 0.2 or about 0.3. By way of example, the width of the tire 604 may be about eleven inches, the first edge 608 may be about fifty-one inches in diameter and the second edge 606 may be about fifty three inches in diameter.

The truncated conical configuration of the embodiment illustrated in FIGS. 19-21 may be desirable, for example, where the wheel is used on a sloped surface or otherwise is not perpendicular with the surface of the ground.

FIG. 21 illustrates a wheel assembly 700 constructed according to another alternative embodiment of the invention. The wheel assembly 700 may be similar or identical to the wheel assembly 22 described above, except that the wheel assembly 700 includes some traction lugs 702 of a first configuration and some traction lugs 704 of a second configuration. More particularly, the wheel assembly 700 includes a total of twelve traction lugs, wherein three of the traction lugs 704 are larger than the remaining nine traction lugs 702. The larger traction lugs 704 have a greater radial reach than the smaller traction lugs 702, such that the larger traction lugs 704 may experience greater ground penetration than the smaller traction lugs 702. This may be desirable, for example, on soft or muddy ground where the wheel assembly 700 is susceptible to slipping on the ground.

Although the invention has been described with reference to the exemplary embodiments illustrated in the attached drawings, it is noted that equivalents may be employed and substitutions made herein without departing from the scope of the invention as recited in the claims. For example, the interchangeable and adjustable spacers 506,508,510 may be used with any of the embodiments of the wheel assembly described herein. Furthermore, spacers may be entirely omitted from any of the embodiments of the wheel assembly described herein. Additionally, any number of traction lugs may be used with the various embodiments of the wheel assembly, the traction lugs may be of virtually any size and shape, and a conventional tire tread may be used instead of traction lugs.

Having thus described various embodiments of the invention, what is claimed as new and desired to be protected by Letters Patent includes the following:

1. A wheel assembly comprising:
    a rigid wheel including a radial wall and an outer rim wall having a plurality of attachment points, each attachment point having an eyelet; and
    an outer flexible airless tire mounted on the rigid wheel, the outer flexible airless tire including a plurality of tire sections, each tire section having opposing first and second ends, the first end having a first plurality of loops and the second end having a second plurality of loops, the first plurality of loops being configured to align with loops of a second end of an adjacent one of the plurality of tire sections and an eyelet of one of the attachment points of the rigid wheel, and the second plurality of loops being configured to align with loops of a first end of an adjacent one of the plurality of tire sections and an eyelet of another one of the attachment points for receiving pins therethrough so as to secure the tire sections onto the rigid wheel.

2. The wheel assembly of claim 1, wherein the outer rim wall of the rigid wheel includes a plurality of planar faces and a plurality of vertices, the outer flexible airless tire being spaced from the planar faces.

3. The wheel assembly of claim 2, wherein each tire section annularly spans three planar faces.

4. The wheel assembly of claim 2, wherein the attachment points are positioned at the vertices.

5. The wheel assembly of claim 2, further comprising a plurality of spacers positioned between the planar faces and the tire sections.

6. The wheel assembly of claim 1, wherein the first plurality of loops and the second plurality of loops are each configured to interdigitate with the loops of the corresponding adjacent tire section.

7. The wheel assembly of claim 6, wherein the first end of the tire section includes three loops and the second end of the tire section includes four loops.

8. The wheel assembly of claim 1, wherein the attachment points each further include an aperture for receiving the loops of the tire sections therein.

9. The wheel assembly of claim 1, wherein the tire sections include four tire sections, each tire section spanning approximately 90 degrees of curvature of the outer flexible airless tire.

10. The wheel assembly of claim 1, wherein each attachment point includes two eyelets positioned on opposing axial margins of the outer rim wall so that the aligned loops are disposed between the two eyelets.

11. A mobile irrigation system comprising:
a structure for supporting an irrigation system conduit; and
a plurality of wheel assemblies supporting the structure, each wheel assembly including:
a rigid wheel including a radial wall and an outer rim wall having a plurality of attachment points, each attachment point having an eyelet;
an outer flexible airless tire mounted on the rigid wheel, the outer flexible airless tire including a plurality of tire sections, each tire section having opposing first and second ends, the first end having a first plurality of loops and the second end having a second plurality of loops, the first plurality of loops being configured to align with loops of a second end of an adjacent one of the plurality of tire sections and an eyelet of one of the attachment points of the rigid wheel, and the second plurality of loops being configured to align with loops of a first end of an adjacent one of the plurality of tire sections and an eyelet of another one of the attachment points for receiving pins therethrough so as to secure the tire sections onto the rigid wheel.

12. The mobile irrigation system of claim 11, wherein the outer rim wall of the rigid wheel includes a plurality of planar faces and a plurality of vertices, the outer flexible airless tire being spaced from the planar faces.

13. The mobile irrigation system of claim 12, wherein each tire section annularly spans three planar faces.

14. The mobile irrigation system of claim 12, wherein the attachment points are positioned at the vertices.

15. The mobile irrigation system of claim 12, further comprising a plurality of spacers positioned between the planar faces and the tire sections.

16. The mobile irrigation system of claim 11, wherein the first plurality of loops and the second plurality of loops are each configured to interdigitate with the loops of the corresponding adjacent tire section.

17. The mobile irrigation system of claim 16, wherein the first end of the tire section includes three loops and the second end of the tire section includes four loops.

18. The mobile irrigation system of claim 11, wherein the attachment points further include an aperture for receiving the loops of the tire sections therein.

19. The mobile irrigation system of claim 11, wherein the tire sections include four tire sections, each tire section spanning approximately 90 degrees of curvature of the outer flexible airless tire.

20. The mobile irrigation system of claim 11, wherein each attachment point includes two eyelets positioned on opposing axial margins of the outer rim wall so that the aligned loops are disposed between the two eyelets.

* * * * *